(12) United States Patent
Jeong et al.

(10) Patent No.: US 10,063,905 B2
(45) Date of Patent: Aug. 28, 2018

(54) SYSTEM FOR CONTROLLING DEVICE, DIGITAL DEVICE, AND METHOD FOR CONTROLLING SAME

(71) Applicant: LG ELECTRONICS INC., Seoul (KR)

(72) Inventors: Hyeryoung Jeong, Seoul (KR); Seunghyun Heo, Seoul (KR); Joonghee Han, Seoul (KR); Hyangjin Lee, Seoul (KR); Mingi Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/531,388

(22) PCT Filed: Jun. 1, 2015

(86) PCT No.: PCT/KR2015/005460
§ 371 (c)(1),
(2) Date: May 26, 2017

(87) PCT Pub. No.: WO2016/085070
PCT Pub. Date: Jun. 2, 2016

(65) Prior Publication Data
US 2017/0332128 A1    Nov. 16, 2017

(30) Foreign Application Priority Data
Nov. 26, 2014    (KR) .................. 10-2014-0166678

(51) Int. Cl.
*H04N 5/44* (2011.01)
*H04N 21/4227* (2011.01)
(Continued)

(52) U.S. Cl.
CPC ......... *H04N 21/4227* (2013.01); *G06F 3/167* (2013.01); *G10L 15/22* (2013.01);
(Continued)

(58) Field of Classification Search
CPC ............. H04N 21/4227; H04N 5/4403; H04N 5/44504; H04N 21/42203; H04N 5/50;
(Continued)

(56) References Cited

U.S. PATENT DOCUMENTS

2005/0132420 A1*  6/2005  Howard .................. G06F 3/017
                                                            725/135
2005/0210064 A1*  9/2005  Caldini ............... H04L 12/6418
(Continued)

FOREIGN PATENT DOCUMENTS

KR    1020020043635    6/2002
KR      100768653     10/2007
(Continued)

OTHER PUBLICATIONS

PCT International Application No. PCT/KR2015/005460, Written Opinion of the International Searching Authority dated Sep. 16, 2015, 18 pages.
(Continued)

*Primary Examiner* — Michael Lee
(74) *Attorney, Agent, or Firm* — Lee, Hong, Degerman, Kang & Waimey PC

(57) ABSTRACT

A digital device and a method for controlling the digital device are disclosed in this specification. Herein, according to an exemplary embodiment of the present invention, a targeted device being controlled by a control command received through at least one or more controlling devices includes a first receiving unit receiving content, a second receiving unit receiving a voice signal or text data respective to the voice signal from the controlling device, a decoder
(Continued)

decoding the content, a processing unit processing the text data, a controlling unit identifying whether or not text data received from the processing data include a control command, controlling an output of a voice interface in response to a reception of the identified text data, configuring a result screen respective to the processed data and controlling an output of the result screen, and performing control operations so as to execute functions corresponding to the outputted result screen, and an outputting unit outputting the decoded content, the voice interface and its result screen or its function execution screen.

16 Claims, 28 Drawing Sheets

(51) Int. Cl.
H04N 21/422 (2011.01)
H04M 1/725 (2006.01)
G06F 3/16 (2006.01)
H04N 5/445 (2011.01)
G10L 15/26 (2006.01)
G10L 15/22 (2006.01)
H04N 5/50 (2006.01)

(52) U.S. Cl.
CPC ....... *G10L 15/265* (2013.01); *H04M 1/72533* (2013.01); *H04N 5/4403* (2013.01); *H04N 5/44504* (2013.01); *H04N 21/42203* (2013.01); G10L 2015/223 (2013.01); *H04N 5/50* (2013.01); H04N 2005/443 (2013.01); H04N 2005/4425 (2013.01)

(58) Field of Classification Search
CPC ...... H04N 2005/4425; H04N 2005/443; G06F 3/167; G10L 5/22; G10L 15/265; G10L 2015/223; H04M 1/72533

USPC ........................................................ 348/734
See application file for complete search history.

(56) References Cited

U.S. PATENT DOCUMENTS

| | | | |
|---|---|---|---|
| 2009/0030681 A1* | 1/2009 | Sureka .................. | G10L 15/193 704/235 |
| 2009/0112592 A1* | 4/2009 | Candelore ............ | H04N 5/4403 704/246 |
| 2011/0119715 A1* | 5/2011 | Chang .................... | G08C 17/02 725/53 |
| 2013/0253937 A1* | 9/2013 | Cho ........................ | G06F 3/167 704/275 |
| 2014/0122059 A1 | 5/2014 | Patel et al. | |
| 2014/0181865 A1* | 6/2014 | Koganei .......... | H04N 21/42203 725/38 |
| 2016/0034058 A1* | 2/2016 | Stauber .................. | G08C 17/02 345/173 |
| 2016/0320849 A1* | 11/2016 | Koo ........................ | G06F 3/017 |

FOREIGN PATENT DOCUMENTS

| | | |
|---|---|---|
| WO | 2013012107 | 1/2013 |
| WO | 2014088146 | 6/2014 |
| WO | 2014088377 | 6/2014 |

OTHER PUBLICATIONS

European Patent Office Application Serial No. 15862550.9, Search Report dated Jun. 13, 2018, 10 pages.

* cited by examiner

FIG. 5
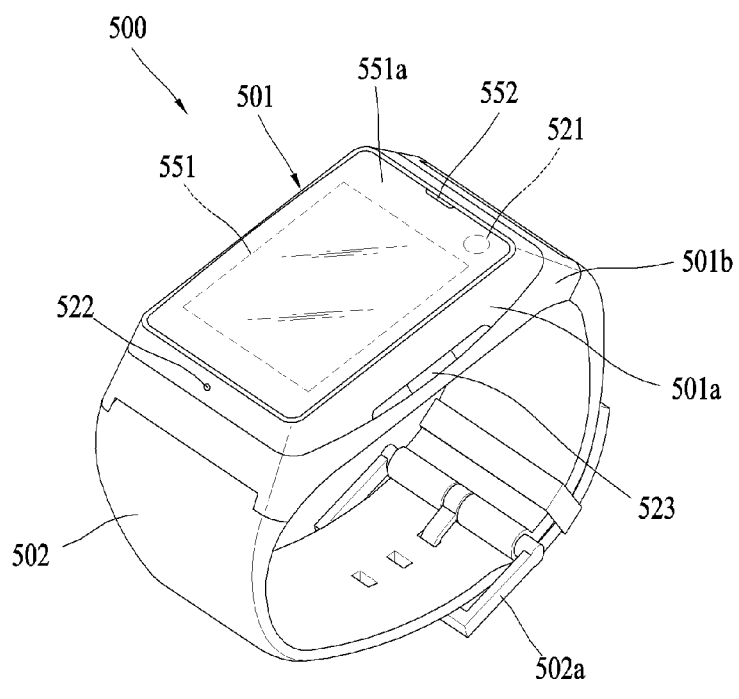
(a)
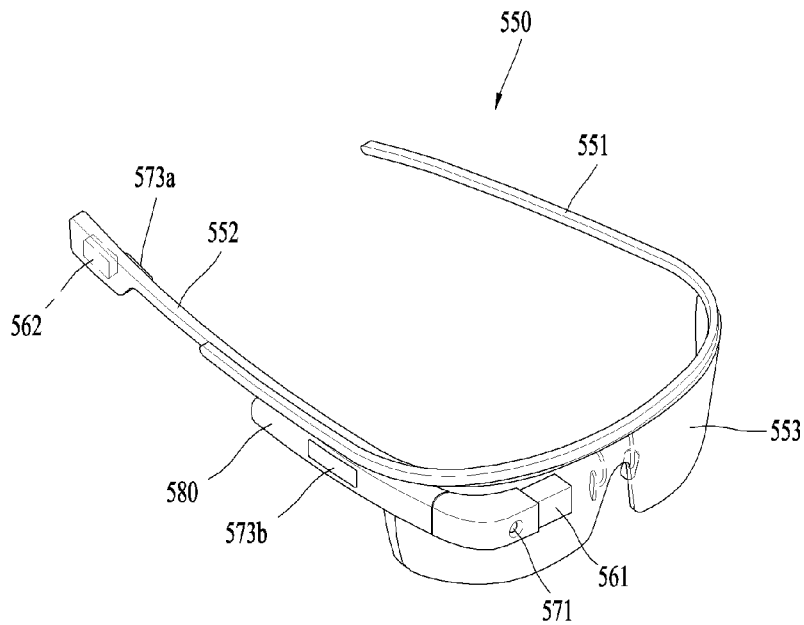
(b)

FIG. 25

| Spoken words of user | Screen operations |
| --- | --- |
| "Show me NAVER" | Move to corresponding webpage |
| "Search OO in NAVER" | Execute search after moving to corresponding webpage<br>Show result screen respective to search word of search site (or search engine) spoken by user<br>State of being inputted in search word text field |
| "Search OO web"<br>"Inform me of (Tell me) OO" | Perform search after moving to main web of each country<br>Show result screen respective to search word of search site (or search engine) spoken by user<br>State of being inputted in search word text field |

FIG. 26

FIG. 36
(a)
(b)

SYSTEM FOR CONTROLLING DEVICE, DIGITAL DEVICE, AND METHOD FOR CONTROLLING SAME

CROSS-REFERENCE TO RELATED APPLICATIONS

This application is the National Stage filing under 35 U.S.C. 371 of International Application No. PCT/KR2015/005460, filed on Jun. 1, 2015, and also claims the benefit of earlier filing date and right of priority to Korean Patent Application No. 10-2014-0166678 filed on Nov. 26, 2014, the contents of which are all hereby incorporated by reference herein in their entirety.

FIELD OF THE INVENTION

The present invention relates to a device controlling system and, more particularly, to a control of a targeted device through a control command of a controlling device.

BACKGROUND ART

The transition from analog systems to digital systems is being realized at a fast rate, and, due to its robustness against external noise as compared to the related art analog system, the digital system undergoes less data loss and is advantageous for performing error correction, and the digital system may also provide two-way services.

A digital TV may be given as a main example of the digital system, and the related art digital TV was capable of performing control only through a remote controller, which is paired with the digital TV during its fabrication. However, with the evolution in the digital and convergence technology, a remote application may be downloaded and installed in a smart phone, which may then be used instead of the remote controller.

However, in case of using the smart phone instead of the remote controller, not only due to the need for a separate application to be downloaded and installed in order to perform the control, since the installed application should be executed before performing the control, and since the installed application can only support the same functions of the remote controller or only some of the functions of the remote controller, this is not much different from the remote controller and rather caused inconvenience during the above-described control process.

Additionally, in case of controlling the TV by using the remote controller or the smart phone, most of the users use only the pre-decided functions, and, in order to use diverse functions and scenarios available through the TV other than the above-mentioned pre-decided functions, a separate installation of a program or application or a separate process is required, which leads to an inconvenience in its usage. Such inconvenience causes a decrease in the frequency of using the corresponding function or scenario, and, among the numerous functions carrying out useful functions or scenarios that can be provided by the TV, the user eventually uses only the basic functions of the TV, thereby causing a problem of preventing the user from properly using his (or her) TV. In other words, despite the consistent evolution of the TV in accordance with the gradual evolution of technology and the digital environment, due to the deficiency or inconvenience in the interface supporting such evolution, it becomes difficult for the user to recognize such evolution in the TV technology, which results in the user using only the basic functions. This causes a problem in that the burden of the cost of the device increases in comparison to the user's usage of the basic functions.

DETAILED DESCRIPTION OF THE INVENTION

Technical Objects

In order to resolve the above-described problems, an object of the present invention is to control a targeted device by using basic functions or embedded functions of a controlling device without having to install a separate application or program, and so on.

Another object of the controlling device according to the present invention is to control the targeted device not only based upon a method of pressing function button equipped in a related art remote controller or touching a function icon that is provided in accordance with an execution of a remote application of a smart phone but also based upon voice, gesture, and so on.

As opposed to being capable of performing only the pre-decided functions, in case of using the function button of the remote controller or the function icon respective to the remote application of a smart phone, yet another object of the present invention is to more intuitively and conveniently control the various function(s) available for support by the targeted device other than the above-described pre-decided functions.

Yet another object of the present invention is not only to control a targeted device by conveniently using a neighboring controlling device without having to move around in order to locate a remote controller, which was mapped to the pre-determined targeted device during its fabrication, but also to control the targeted device at a remote location via network.

The technical objects that are to be achieved in the present invention will not be limited only to the technical objects that are described above. Accordingly, technical objects that have not been mentioned above or additional technical objects of the present application may become apparent to those having ordinary skill in the art from the description presented below.

Technical Solutions

In order to resolve the above-described technical object, a targeted device being controlled by a control command received through at least one or more controlling devices according to an exemplary embodiment of the present invention includes a first receiving unit receiving content, a second receiving unit receiving a voice signal or text data respective to the voice signal from the controlling device, a decoder decoding the content, a processing unit processing the text data, a controlling unit identifying whether or not text data received from the processing data include a control command, controlling an output of a voice interface in response to a reception of the identified text data, configuring a result screen respective to the processed data and controlling an output of the result screen, and performing control operations so as to execute functions corresponding to the outputted result screen, and an outputting unit outputting the decoded content, the voice interface and its result screen or its function execution screen.

A device controlling system including controlling devices and a targeted device according to an exemplary embodiment of the present invention includes a first controlling device receiving a voice signal, converting the received voice signal to digital voice data, and outputting the converted text data, a second controlling device performing STT processing on the digital voice data and generating and outputting text data respective to the voice signal, and a targeted device outputting a voice interface related to the reception of the voice signal, performing NLP processing on the text data received from the second controlling device and configuring and outputting a result screen respective to the text data, and executing a function corresponding to the outputted result screen.

A method for controlling a targeted device by a control command received through at least one or more controlling devices according to an exemplary embodiment of the present invention includes a step of receiving content, a step of decoding the content and outputting the decoded content to a screen, a step of receiving a voice signal or text data respective to the voice signal from the controlling device, a step of processing the received voice signal or text data, a step of identifying whether or not a control command is included in the processed data and outputting a voice interface, a step of configuring and outputting a result screen respective to the control command included in the processed data, a step of executing functions corresponding to the outputted result screen, and a step of outputting the function execution screen.

A method for controlling a device controlling system including controlling devices and a targeted device according to an exemplary embodiment of the present invention includes a step of receiving a voice signal, converting the received voice signal to digital voice data, and outputting the converted text data, a step of performing STT processing on the digital voice data and generating text data respective to the voice signal, and a step of performing NLP processing on the text data, and a step of configuring and outputting a result screen and a function execution screen respective to the NLP processed text data.

The technical solutions that are to be achieved in the present invention will not be limited only to the technical solutions that are described above. Accordingly, technical solutions that have not been mentioned above or additional technical solutions of the present application may become apparent to those having ordinary skill in the art from the description presented below.

Effects of the Invention

According to the present invention, the effects are as described below.

According to an exemplary embodiment among diverse exemplary embodiments of the present invention, a targeted device may be controlled by using basic functions or embedded functions of a controlling device without having to install a separate application or program, and so on.

According to another exemplary embodiment among diverse exemplary embodiments of the present invention, the targeted device may be controlled not only based upon a method of pressing function button equipped in a related art remote controller or touching a function icon that is provided in accordance with an execution of a remote application of a smart phone but also based upon voice, gesture, and so on.

According to yet another exemplary embodiment among diverse exemplary embodiments of the present invention, as opposed to being capable of performing only the pre-decided functions, in case of using the function button of the remote controller or the function icon respective to the remote application of a smart phone, the various function(s) available for support by the targeted device other than the above-described pre-decided functions may be controlled more intuitively and conveniently.

The effects that are to be achieved in the present invention will not be limited only to the effects that are described above. Accordingly, effects that have not been mentioned above or additional effects of the present application may become apparent to those having ordinary skill in the art from the description presented below.

BRIEF DESCRIPTION OF THE DRAWINGS

FIG. 5 is a block diagram for explanation of detailed configurations of a controller of FIGS. 2 to 4 according to an embodiment of the present invention;

FIGS. 25 to 28 illustrate drawings for describing operations of the targeted device according to FIG. 24;

FIG. 36 illustrates a drawing for describing interactive data processing procedure of the targeted device according to an exemplary embodiment of the present invention.

BEST MODE FOR CARRYING OUT THE PRESENT INVENTION

Figure 1:
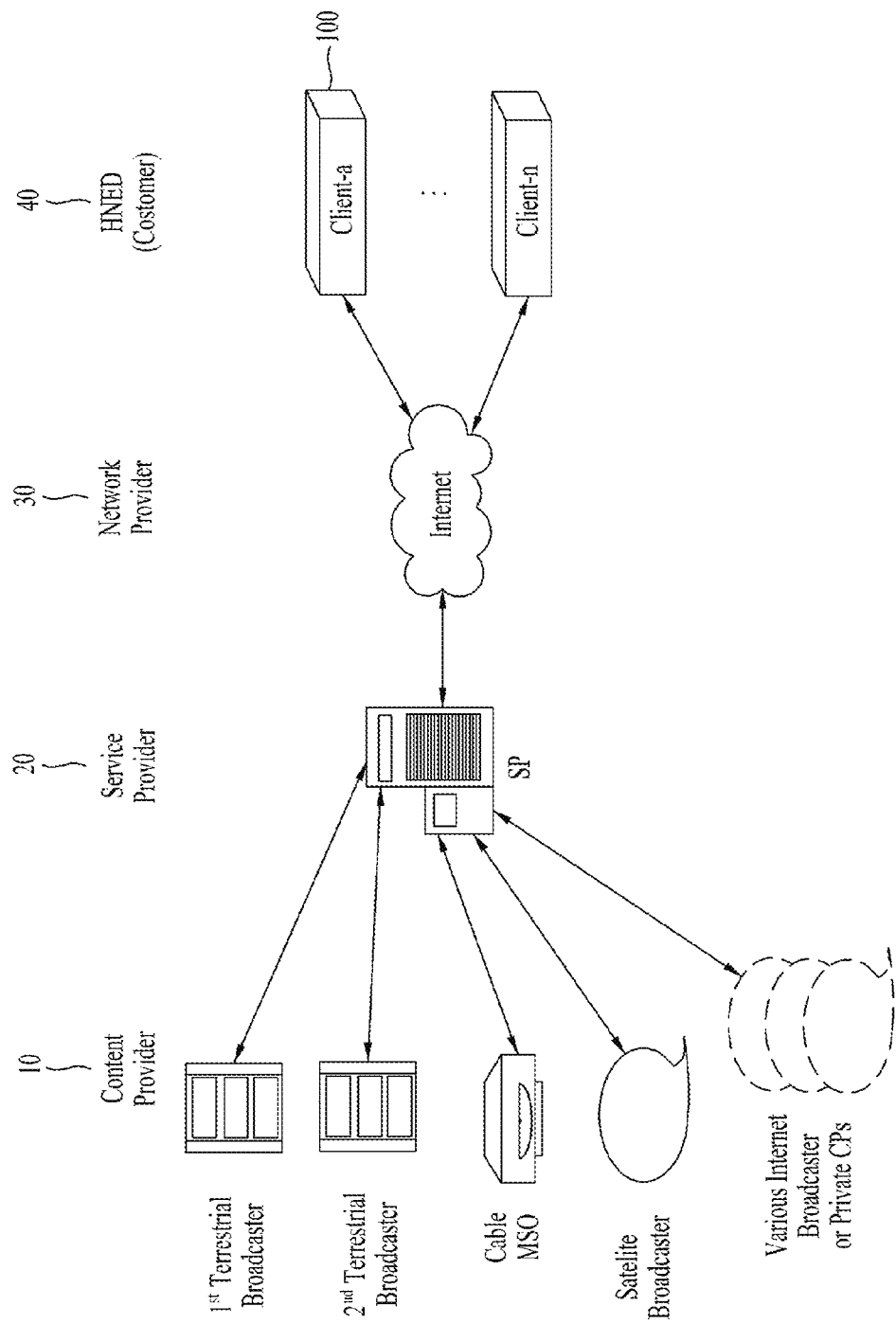
FIG. 1 is a schematic diagram for explanation of a service system including a digital device according to an embodiment of the present invention.

Description will now be given in detail according to various embodiments of a device control system, a digital device and a method of controlling the digital device disclosed herein, with reference to the accompanying drawings.

For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, contents specified in the present disclosure or drawings are an embodiment of the present invention, so a scope of the present invention must be determined through a claim set.

A digital device in the present disclosure as set forth herein may be any device that can handle any one of transmitting, receiving, handling and outputting data, content, service, application, and so forth. The digital device may be connected or paired (hereinafter, 'pairing') to other digital devices, an external server and so on through wired network or wireless network, and through the connections, the digital device may transmit and receive the prescribed data. The prescribed data includes control data. And, if necessary, the prescribed data may be properly converted before transmission/reception. Examples of the digital device may include standing devices such as a network television (TV), a Hybrid Broadcast Broadband TV (HBBTV), a smart TV, Internet Protocol TV (IPTV), and personal computer (PC), or mobile (or handheld) devices such as a Personal Digital Assistant (PDA), a smart phone, a tablet PC, or an Notebook computer. For convenience of description, in this disclosure, the Digital TV (DTV) is used in FIGS. 2 and 3, the mobile device is used in FIG. 4, and the wearable device is used in FIG. 5, depicting the digital device. Meanwhile, the wearable device can be formed a watch type, a glass type, a chip type and so on, but the present disclosure specifies a smart watch as the watch type according to an embodiment of the present invention. Further, the digital device in this disclosure may be referred to a digital signage configured only a panel, a monitor or a display device, or a part of a single service system including a set-top box (STB), or through a combination of a server.

Moreover, the wired/wireless network described in this disclosure may refer to various pairing methods, standard telecommunication network protocol methods which are supported for transmitting and receiving data between digital devices or between digital device and the external server. The wired or wireless network also includes various telecommunication network protocols supported now as well as in the future. Examples of the wired or wireless network include wired networks supported by various telecommunication standard such as a Universal Serial Bus (USB), a Composite Video Banking Sync (CVBS), a Component, a S-Video (analog), a Digital Visual Interface (DVI), a High Definition Multimedia Interface (HDMI), a RGB, a D-SUB and so forth, and wireless networks supported by various standards including Bluetooth™, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, the disclosure referring simply to the digital device can include a standing device or a mobile device depending on the context, and when it is not referred to a specific device, the digital device referred in this disclosure refers to both standing and mobile device.

Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means supporting a handwriting input, a touch-screen, and a spatial remote control.

Furthermore, the digital device may use a standard operating system (OS), however, the digital device described in this disclosure and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input mechanisms or digital devices, capable of transmitting and receiving data through wired or wireless network connected to and from the digital device. For example, the external input includes HDMI, game devices such as Playstation or X-Box, smart phone, tablet PC, printing device such as pocket photo, digital devices such as smart TV and Blue-ray device.

The "server" referred to as in this disclosure, includes a digital device or a system capable of transmitting and receiving data to and from a client, and may also be referred to as a processor. For example, the server may be servers providing services such as a portal server providing a web page, a web content or a web service, an advertising server providing advertising data, a content server, a Social Network Service (SNS) server providing a SNS service, a service server providing a service by a manufacturer, a Multichannel Video Programming Distributor (MVPD) providing a Video on Demand (VoD) or a streaming service, and a service server providing pay services.

When an application is described for the convenience of explanation, the meaning of disclosure in the context may include services as well as applications, and a web application supported by a Web OS platform according to the present invention.

A device controlling system including controlling devices and a targeted device according to an exemplary embodiment of the present invention includes a first controlling device receiving a voice signal, converting the received voice signal to digital voice data, and outputting the converted text data, a second controlling device performing STT processing on the digital voice data and generating and outputting text data respective to the voice signal, and a targeted device outputting a voice interface related to the reception of the voice signal, performing NLP processing on the text data received from the second controlling device and configuring and outputting a result screen respective to the text data, and executing a function corresponding to the outputted result screen.

A targeted device being controlled by a control command received through at least one or more controlling devices according to an exemplary embodiment of the present invention includes a first receiving unit receiving content, a second receiving unit receiving a voice signal or text data respective to the voice signal from the controlling device, a decoder decoding the content, a processing unit processing the text data, a controlling unit identifying whether or not text data received from the processing data include a control command, controlling an output of a voice interface in response to a reception of the identified text data, configuring a result screen respective to the processed data and controlling an output of the result screen, and performing control operations so as to execute functions corresponding to the outputted result screen, and an outputting unit outputting the decoded content, the voice interface and its result screen or its function execution screen.

In the following description, various embodiments according to the present invention are explained with reference to attached drawings.

FIG. 1 illustrates a broadcast system including a digital device according to an embodiment of the present invention.

Referring to FIG. 1, examples of a broadcast system comprising a digital device may include a content provider (CP) 10, a service provider (SP) 20, a network provider (NP) 30, and a home network end user (HNED) (Customer) 40. The HNED 40 includes a client 100, that is, a digital device.

The CP 10 produces and provides content. Referring to FIG. 1, the CP 10 can include a terrestrial broadcaster, a cable system operator (SO) or multiple system operator (MSO), a satellite broadcaster, various Internet broadcasters, private content providers (CPs), etc. The CP 10 can provide various service or application web as well as broadcast content.

The SP 20 service-packetizes content produced by the CP 10. For example, the SP 20 packetizes at least one service among contents produced by a first terrestrial broadcaster, a second terrestrial broadcast, a cable MSO, a satellite broadcaster, various internet broadcasters, an application, etc. And, the SP 20 provides the packetized at least one service to the HNED 40.

The SP 20 can provide services to the client 100 in a uni-cast or multi-cast manner. The SP 20 can transmit data to a preregistered various clients 100 at once using an IGMP (Internet Group Management Protocol), etc.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100.

The client 100 is a consumer included in the HNED 40, construct a home network, receive data and transmit/receive data for various service or application like a VoD (video on demand), a streaming, and the like.

The CP 10 and/or SP 20 can use a content protection means or a conditional access for a content to be transmitted. In this case, the client 100 can use a means such as a cable card (CableCARD) (or a POD: Point of Deployment) or downloadable CAS (DCAS), which corresponds to the content protection means of the CP 10 and/or SP 20.

In addition, the client 100 can use an interactive service through a network. In this case, the client 100 can directly serve as the CP 10 and/or the SP 20 in a relationship with another client or indirectly function as a server of the other client.

In FIG. 1, the CP 10 and/or SP 20 may a server providing a service as below in this disclosure. In this case, if necessary, the server may include the NP 30. Although it is not described more specifically, the service or application can include not only service or application received from an external server also the service or application received from an internal memory. The service or application can include service or application data for the Client 100 based on a Web OS.

Figure 2:
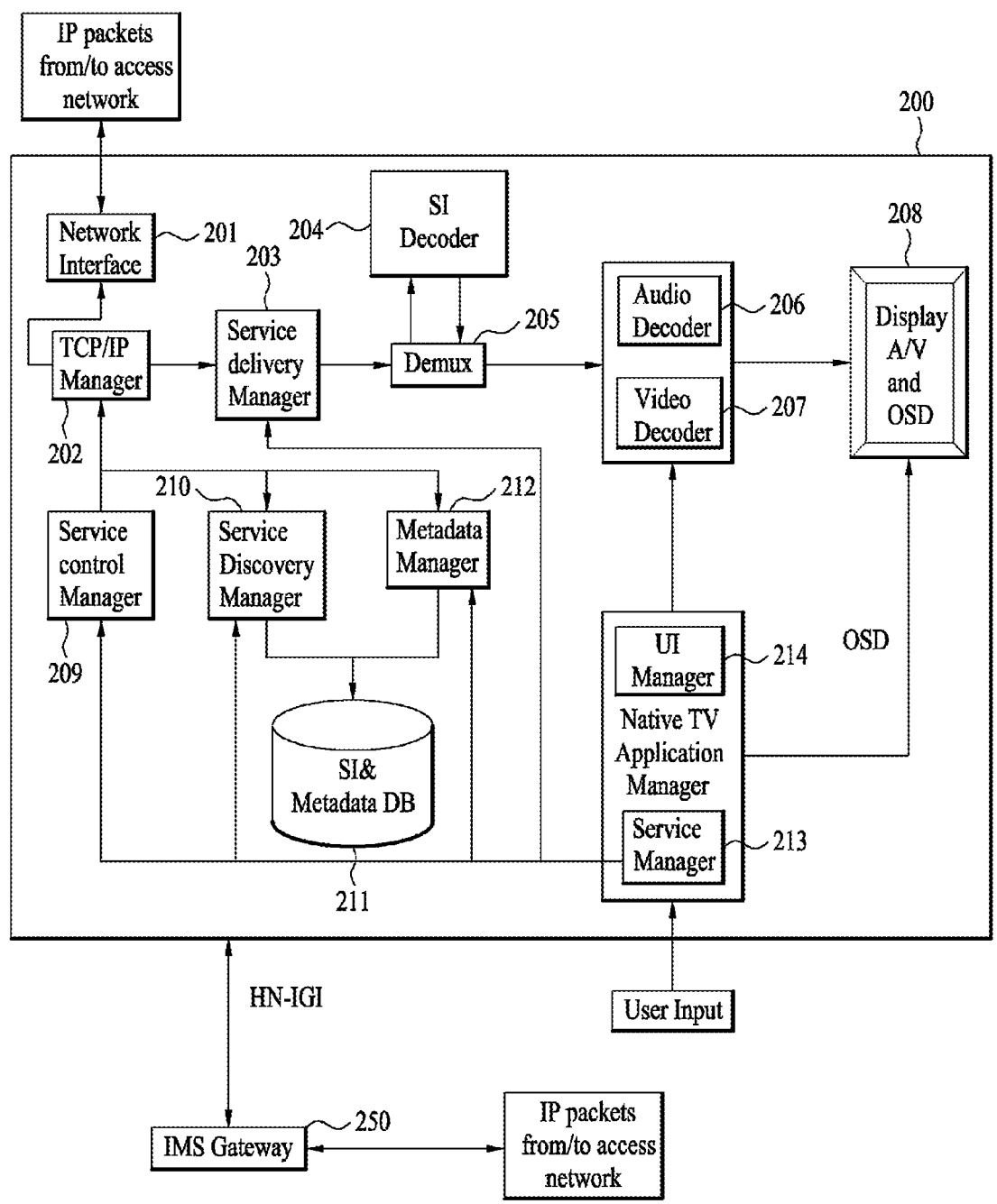
FIG. 2 is a block diagram for explanation of a digital device according to an embodiment of the present invention.

FIG. 2 is a schematic diagram of a digital device 200 according to an embodiment of the present invention.

Hereinafter, the digital device in the present disclosure may correspond to the client 100 shown in FIG. 1.

The digital device 200 may include a network interface 201, a TCP/IP manager 202, a service delivery manager 203, an SI decoder 204, a demultiplexer (or demux) 205, an audio decoder 206, a video decoder 207, a display unit (a display A/V and OSD (On Screen Display) module) 208, a service control manager 209, a service discovery manager 210, a SI & metadata database (DB) 211, a metadata manager 212, a service manager 213, a UI (user interface) manager, etc.

The network interface 201 may receive or transmit internet protocol (IP) packets or IP datagrams (hereinafter, IP packet(s)) through an accessed network. As an example, the network interface 201 may receive service, application, content and the like from the service provider 20 of FIG. 1 via the network. Here, side information may include SI information. Also, the network interface 201 may be replaced with a tuner.

The TCP/IP manager 202 may involve delivery of IP packets transmitted to the digital device 200 and IP packets transmitted from the digital device 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212 and the like.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feedback network reception information to the server on the basis of the RTP.

The demultiplexer 205 may demultiplex audio data, video data, SI (System Information) from a received packet and transmit the demultiplexed data to the audio/video decoder 206/207 and the SI decoder 204, respectively.

The SI decoder 204 may decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 may store the parsed and/or decoded SI data in the SI&metadata DB 211. The SI data stored in the SI&metadata DB 211 can be read or extracted and used by a component which requires the SI data.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a UI manager 214, perform a function of a controller of the digital device 200. In other words, the application manager may administrate the overall state of the digital device 200, provide a UI, and manage other mangers.

The UI manager 214 can provide a graphic user interface (GUI)/UI through OSD, receive a key input from the user and perform an operation of the device in accordance with the received key input. For instance, the UI manager 214 transmits the key input signal to the service manager 213 if the key input related to a channel selection from the user.

The service manager 213 may control and manage service-related managers such as the service delivery manager 203, the service discovery manager 210, the service control manager 209, the metadata manager 212, and the like.

The service manager 213 may configure a channel map and enable channel control at the request of the user on the basis of the channel map. The service manager 213 may receive service information corresponding to channel from the SI decoder 204 and set audio/video PID of a selected channel to the demultiplexer 205 so as to control the demultiplexing procedure of the demultiplexer 205. Accordingly, the demultiplexer 205 filters audio data, video data and SI data using PIDs (PID or section filtering).

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP or real time streaming protocol (RTSP) when the user selects a live broadcast service and using RTSP when the user selects a VoD service. The RTSP can provide a trick mode related a real time broadcast. Also, the service control manage 209 can initialize a session via an IMS gateway using an IMS (IP Multimedia Subsystem) and SIP (Session Initiation Protocol) and manage it. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

The IMS gateway 250 may include functions required to access an IMS based IPTV services.

Figure 3:
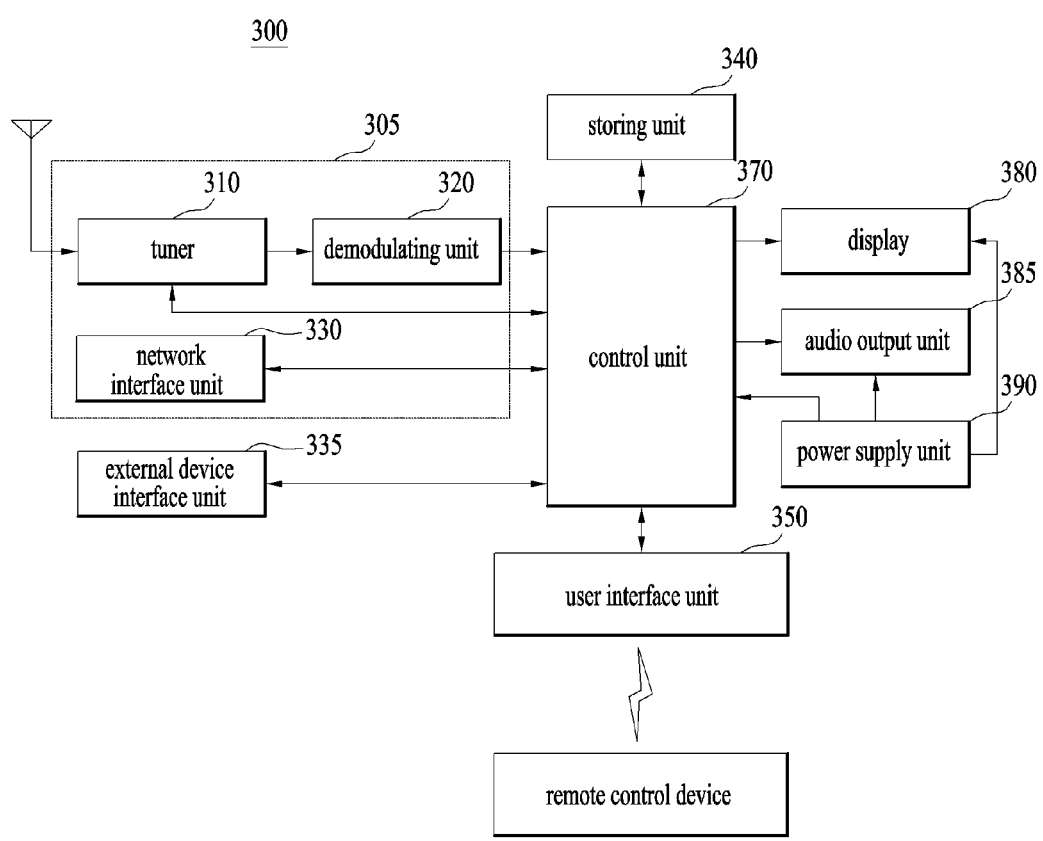
FIG. 3 is a block diagram for explanation of a digital device according to another embodiment of the present invention.

FIG. 3 illustrates a digital device according to another embodiment of the present invention.

Referring to FIG. 3, a digital device 300 according to another embodiment of the present invention may include a broadcast receiving unit 305, an external device interface 335, a storage unit 340, a user input interface 350, a controller 370, a display unit 380, an audio output unit 385, a power supply unit 390, and a photographing unit (not shown). The broadcast receiving unit 305 may include at least one of tuner 310, a demodulator 320, and a network interface 330. The broadcast receiving unit 305 may include the tuner 310 and the demodulator 320 without the network interface 330, and vice versa. Also, the broadcast receiving unit 305 may include a multiplexer (not shown) to multiplex a signal, which is subjected to the tuner 310 and demodulated by the demodulator 320, and a signal received through the network interface 330. In addition, the broadcast receiving unit 305 can include a demultiplexer (not shown) and demultiplex a multiplexed signal, a demodulated signal, or a signal received through the network interface 330.

The tuner 310 may receive a radio frequency (RF) broadcast signal by tuning to a channel selected by the user from among RF broadcast signals received through an antenna or all previously stored channels. Also, the tuner 310 may convert the received RF broadcast signal into an Intermediate Frequency (IF) signal or a baseband signal.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 310 can process both the digital broadcast signal and the analog broadcast signal. The analog baseband image or a voice signal output from the tuner 310 can be directly input to the controller 370.

The tuner 310 can receive a RF broadcast signal of single carrier or multiple carriers. The tuner 310 can sequentially tune and receive a RF broadcast signal of all broadcast channel stored by a channel memory function among RF broadcast signal received through an antenna to. And, the tuner 310 can convert the received RF broadcast signal into the DIF.

The demodulator 320 receives the DIF signal, demodulates the received DIF signal, and performs a channel decoding, etc. For this, the demodulator 320 includes a trellis decoder, a de-interleaver, a Reed-Solomon decoder, etc., or includes a convolution decoder, the de-interleaver, the Reed-Solomon decoder, etc.

The demodulator 320 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal outputted from the demodulator 320 may be inputted to the controller 470. The controller 370 can control demultiplexing, audio/video signal processing, etc. Furthermore, the controller 370 can control output of an image through the display unit 480 and output of audio through the audio output unit 385.

The external device interface 335 may provide an environment for interfacing external devices with the digital device 400. To implement this, the external device interface 335 may include an A/V input/output unit (not shown) or an RF communication unit (not shown).

The external device interface 335 can be connected with external devices such as a digital versatile disk (DVD), a Blu-ray player, a game device, a camera, a camcorder, a computer (including a notebook computer), a tablet PC, a smart phone, a Bluetooth device, a Cloud server and the like in a wired/wireless manner. The external device interface 335 transfer a signal to the controller 370 of the digital device. The signal includes image data, video data, audio data which is input through an external device. The external device is connected to the digital device. The controller 370 can control to output the signal including the processed image data, the processed video data and the processed audio data to the connected external device. For this, the external device interface 335 can further include an A/V input/output unit or a wireless communication unit (not shown).

The A/V input/output unit may include a USB terminal, a CVBS terminal, a component terminal, an S-video terminal (analog), a DVI terminal, a HDMI terminal, an RGB terminal, a D-SUB terminal, etc.

The RF communication unit can perform near field communication. The digital device 300 can be networked with other electronic apparatuses according to communication protocols such as Bluetooth, radio frequency identification (RFID), infrared data association (IrDA), ultra wideband (UWB), ZigBee, and digital living network alliance (DLNA), for example.

Also, the external device interface 335 can connect a STB via at least one interface described above, and perform an input/output operation with the connected STB.

Meanwhile, the external device interface 335 can receive application or application list included in a nearby external device, and can transfer the application or the application list to the controller 370 or the storage unit 340.

The network interface 330 may provide an interface for connecting the digital device 300 with a wired/wireless network including an internet network. The network interface 330 can equip, for example, an Ethernet terminal to connect with a wired network and use a communication standard like wireless LAN (WLAN) (Wi-Fi), Wibro, Wimax, and HSDPA to connect with a wireless network.

The network interface 330 can transmit/receive data to/from other users or other electronic apparatuses or access a network connected thereto or another network linked to the connected network. Especially, the network interface 330 can transmit some content data stored in the digital device to another user pre-registered in the digital device 300, a user using another digital device or a selected digital device.

Meanwhile, the network interface 330 can access a web page through a connected network or another network linked to the connected network. That is, the network interface 330 can transmit/receive data to/from a corresponding server by accessing the web page through the network. Besides, the network interface 330 can receive content or data provided from a content provider or a network provider. That is, the network interface 330 can receive the content like a movie, an advertisement, a game, a VoD, a broadcast signal and related information provided from the content provider or network provider. And, the network interface 330 can receive firmware update information and an update file provided from the network provider. Also, the network interface 330 can transmit data to internet, content provider or network provider.

The network interface 330 can selectively receive a desired application from among publicly open applications through a network.

The storage unit 340 may store programs for signal processing and control and store a processed video, audio or data signal.

In addition, the storage unit 340 may execute a function of temporarily storing a video, audio or data signal input from the external device interface 335 or the network interface 330. The storage unit 340 may store information about a predetermined broadcast channel through a channel memory function.

The storage unit 340 can store an application or a list of applications input from the external device interface 335 or the network interface 330.

The storage unit 340 may store various platforms which will be described later.

The storage unit 340 can include storage media of one or more types, such as a flash memory type, a hard disk type, a multimedia card micro type, a card type memory (e.g. SD or XD memory), RAM, EEPROM, etc. The digital device 300 may reproduce content files (e.g., a video file, a still image file, a music file, a text file, an application file, etc.) and provide them to the user.

While FIG. 3 illustrates an embodiment in which the storage unit 340 is separated from the controller 370, the configuration of the digital device 400 is not limited thereto and the storage unit 340 may be included in the controller 370.

The user input interface 350 may transmit a signal input by the user to the controller 370 or deliver a signal output from the controller 370 to the user.

For example, the user input interface 350 can receive control signals such as a power on/off signal, a channel selection signal, an image setting signal, etc. from the remote controller or transmit control signals of the controller 370 to the remote controller according to various communication schemes such as RF communication, IR communication, and the like.

The user input interface 350 can transmit control signals input through a power key, a channel key, a volume key, and a local key (not shown) of a set value to the controller 370.

The user input interface 350 can transmit a control signal input from a sensing unit (not shown) which senses a gesture of the user or deliver a signal of the controller 370 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 370 can generate and output a signal for video or audio output by demultiplexing streams input through the tuner 310, the demodulator 320 or the external device interface 335 or processing demultiplexed signals.

A video signal processed by the controller 370 can be input to the display unit 380 and displayed as an image through the display unit 380. In addition, the video signal processed by the controller 370 can be input to an external output device through the external device interface 335.

An audio signal processed by the controller 370 can be applied to the audio output unit 385. Otherwise, the audio signal processed by the controller 370 can be applied to an external output device through the external device interface 335.

The controller 370 may include a demultiplexer and an image processor, which are not shown in FIG. 3.

The controller 370 can control the overall operation of the digital device 300. For example, the controller 370 can control the tuner 310 to tune to an RF broadcast corresponding to a channel selected by the user or a previously stored channel.

The controller 370 can control the digital device 300 according to a user command input through the user input interface 350 or an internal program. Particularly, the controller 370 can control the digital device 300 to be linked to a network to download an application or application list that the user desires to the digital device 300.

For example, the controller 370 may control the tuner 310 to receive a signal of a channel selected in response to a predetermined channel selection command received through the user input interface 350. In addition, the controller 370 may process a video, audio or data signal corresponding to the selected channel. The controller 370 may control information on a channel selected by the user to be output with a processed video or audio signal through the display unit 380 or the audio output unit 385.

Alternatively, the controller 370 may control a video signal or an audio signal received from an external apparatus, for example, a camera or a camcorder through the external device interface 335 to be output through the display unit 380 or the audio output unit 385 according to an external device image reproduction command received through the user input interface 350.

The controller 370 can control the display unit 380 to display images. For example, the controller 370 can control a broadcast image input through the tuner 310, an external input image received through the external device interface 335, an image input through the network interface 330, or an image stored in the storage unit 340 to be displayed on the display unit 380. Here, an image displayed on the display unit 380 can be a still image or video, and it can be a 2D (Dimensional) or 3D image.

The controller 370 can control reproduction of content. Here, the content may be content stored in the digital device 300, received broadcast content, or content input from an external device. The content may include at least one of a broadcast image, an external input image, an audio file, a still image, an image of a linked web, and a text file.

The controller 370 can control display of applications or an application list, downloadable from the digital device 300 or an external network, when an application view menu is selected.

The controller 370 can control installation and execution of applications downloaded from an external network in addition to various user interfaces. Furthermore, the controller 370 can control an image relating to an application executed by user selection to be displayed on the display unit 380.

The digital device may further include a channel browsing processor (not shown) which generates a thumbnail image corresponding to a channel signal or an external input signal.

The channel browsing processor can receive a stream signal (e.g., TS) output from the demodulator 320 or a stream signal output from the external device interface 335 and extract an image from the received stream signal to generate a thumbnail image. The generated thumbnail image can be directly input to the controller 370 or can be encoded and then input to the controller 370. Also, the thumbnail image can be coded into a stream and then applied to the controller 370. The controller 370 can display a thumbnail list including a plurality of thumbnail images on the display unit 380 using thumbnail images input thereto. The thumbnail images included in the thumbnail list can be updated sequentially or simultaneously. Accordingly, the user can conveniently check content of a plurality of broadcast channels.

The display unit 380 may convert a video signal, a data signal, and an OSD signal processed by the controller 370 and a video signal and a data signal received from the external device interface 335 into RGB signals to generate driving signals.

The display unit 380 may be a PDP, an LCD, an OLED, a flexible display, a 3D display or the like.

The display unit 380 may be configured as a touch-screen and used as an input device rather than an output device.

The audio output unit 385 receives a signal audio-processed by the controller 370, for example, a stereo signal, a 3.1 channel signal or a 5.1 channel signal, and outputs the received signal as audio. The audio output unit 385 can be configured as one of various speakers.

The digital device 300 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 370 through the user input interface 350.

The digital device may further include the photographing unit (not shown) for photographing the user. Image information acquired by the photographing unit (not shown) can be supplied to the controller 370.

The controller 370 may sense a gesture of the user from an image captured by the photographing unit (not shown) or a signal sensed by the sensing unit (not shown), or by combining the image and the signal.

The power supply unit 390 may supply power to the digital device 300.

Particularly, the power supply unit 390 can supply power to the controller 370 which can be implemented as a system-on-chip (SoC), the display unit 380 for displaying images, and the audio output unit 385 for audio output.

For this, the power supply unit 390 can include a converter (not shown) converting a direct current to an alternative current. And, for example, if the display 380 is implemented as a crystal panel including a plurality of backlight lamps, the power supply unit can include an inverter (not shown) capable of performing a PWM (Pulse Width Modulation) operation to perform a changeable luminance or a dimming operation.

The remote controller (or remote controlling device) may transmit user input to the user input interface 350. To achieve this, the remote controller can use Bluetooth, RF communication, IR communication, UWB, ZigBee, etc.

In addition, the remote controller can receive audio, video or data signal output from the user input interface 350 and display the received signal or output the same as audio or vibration.

The digital devices as described above are a digital broadcast receiver which is capable of processing an ATSC or DVB digital broadcast signal for standing or mobile.

Some of the components may be omitted or a component may be added as required. The digital device according to the present invention may not include the tuner and the demodulator, differently from the digital devices, and may receive content through the network interface or the external device interface and reproduce the content.

Figure 4:
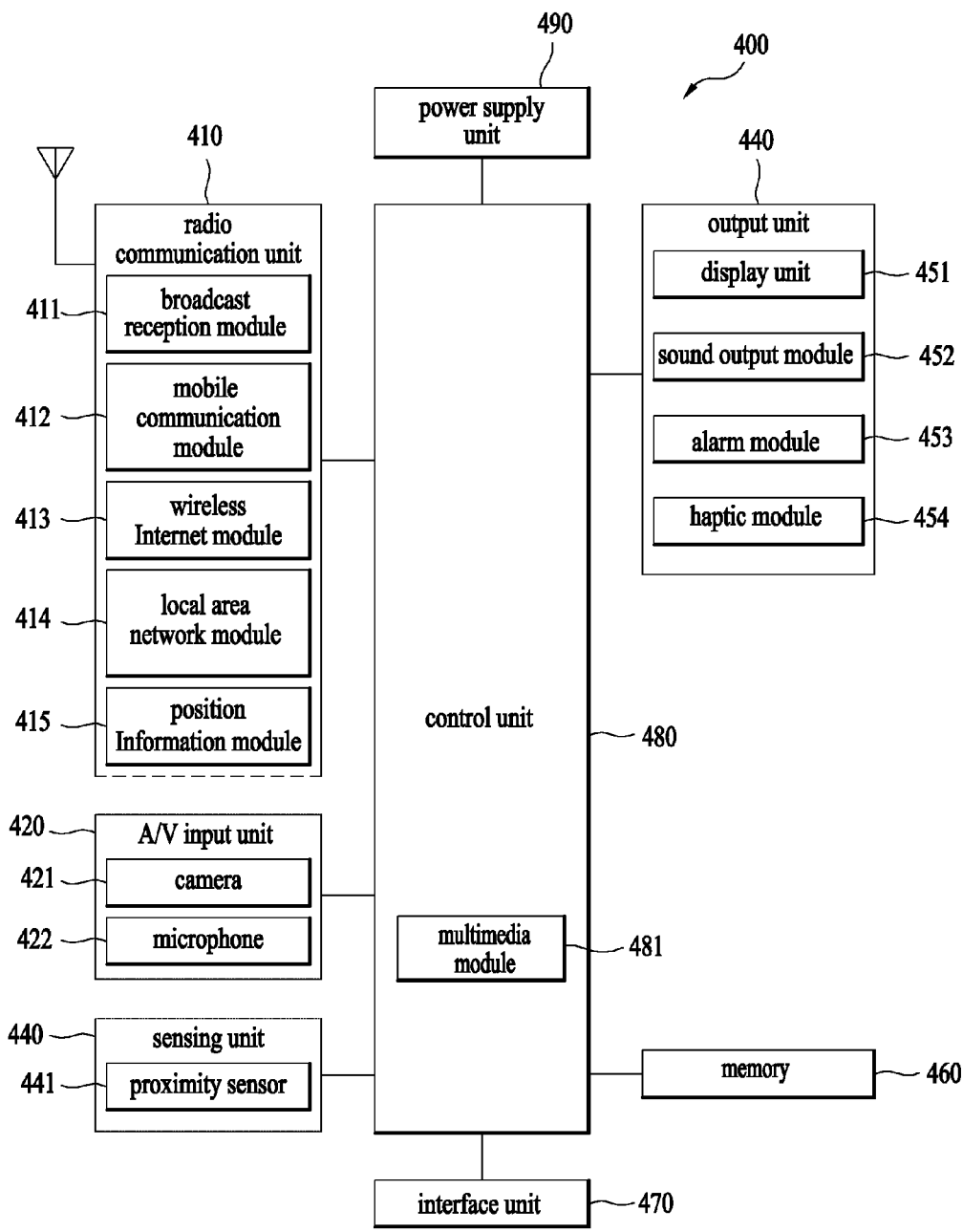
FIG. 4 is a block diagram for explanation of a digital device according to another embodiment of the present invention.

FIG. 4 is a block diagram of a mobile terminal 300 in accordance with an embodiment of the present invention.

FIGS. 2 and 3 specify a standing device as an embodiment of the digital device, and FIG. 4 specifies a mobile terminal as another embodiment of the digital device.

With reference to FIG. 4, the mobile terminal 400 includes a wireless communication unit 410, an A/V (audio/video) input unit 420, a user input unit 430, a sensing unit 440, an output unit 450, a memory 460, an interface unit 470, a controller 480, a power supply unit 490, and the like.

Hereinafter, each element is specified as follows.

The wireless communication unit 410 typically includes one or more components which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, and a position-location module 415.

The broadcast receiving module 411 receives a broadcast signal and/or broadcast associated information from an external broadcast managing server via a broadcast channel. The broadcast channel may include a satellite channel and a terrestrial channel. The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 412.

The broadcast associated information can be implemented in various forms. For instance, broadcast associated information may include an electronic program guide (EPG) and an electronic service guide (ESG).

The broadcast receiving module 411 may be configured to receive broadcast signals transmitted from various types of broadcast systems. By non-limiting example, such broadcasting systems may include ATSC, DVB-T (Digital Video Broadcasting-Terrestrial), DVB-S (Satellite), media forward link only (MediaFLO™), integrated services digital broadcast-terrestrial (ISDB-T) and DTMB/CMMB. Optionally, the broadcast receiving module 411 can be configured to be suitable for other broadcasting systems as well as the above-noted digital broadcasting systems.

The broadcast signal and/or broadcast associated information received by the broadcast receiving module 411 may be stored in a suitable device, such as the memory 360.

The mobile communication module 412 transmits/receives wireless signals to/from at least one of a base station, an external terminal, or a server via a mobile network. Such wireless signals may carry audio, video, and data according to text/multimedia messages.

The wireless Internet module 413 includes wireless Internet access. This module may be internally or externally coupled to the mobile terminal 300. The wireless Internet technology can include Wi-Fi, Wibro™, Wimax™, HSDPA, etc.

The short-range communication module 414 facilitates relatively short-range communications. Suitable technologies for implementing this module include Bluetooth™, radio frequency identification (RFID), infrared data association (IrDA), ultra-wideband (UWB), ZigBee, RS-232, RS-485.

The position-location module 415 identifies or otherwise obtains the location of the mobile terminal 400. According to one embodiment, this module may be implemented with a global positioning system (GPS) module.

The audio/video (A/V) input unit 420 is configured to provide audio or video signal input to the mobile terminal 400. As shown, the A/V input unit 420 includes a camera 421 and a microphone 422. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or can be transmitted to an external recipient via the wireless communication unit 410. Optionally, at least two cameras 421 can be provided in the mobile terminal 400 according to the environment of usage.

The microphone 422 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 412 in a call mode. The microphone 422 typically includes assorted noise removing algorithms to remove noise generated in the course of receiving the external audio signal.

The user input unit 430 generates input data responsive to user manipulation of an associated input device or devices. Examples of such devices include a keypad, a dome switch, a touchpad (e.g., static pressure/capacitance), a jog wheel, and a jog switch.

The sensing unit 440 provides sensing signals for controlling operations of the mobile terminal 400 using status measurements of various aspects of the mobile terminal. For instance, the sensing unit 440 may detect an open/closed status of the mobile terminal 400, the relative positioning of components (e.g., a display and keypad) of the mobile terminal 400, a change of position (or location) of the mobile terminal 400 or a component of the mobile terminal 400, a presence or absence of user contact with the mobile terminal 400, and an orientation or acceleration/deceleration of the mobile terminal 400. As an example, a mobile terminal 400 configured as a slide-type mobile terminal is considered. In this configuration, the sensing unit 440 may sense whether a sliding portion of the mobile terminal is open or closed. According to other examples, the sensing unit 440 senses the presence or absence of power provided by the power supply unit 490, and the presence or absence of a coupling or other connection between the interface unit 470 and an external device. According to one embodiment, the sensing unit 440 can include a proximity sensor 441 including a near field communication (NFC), and the like.

The output unit 450 generates an output relevant to the senses of sight, hearing, and touch. Furthermore, the output unit 450 includes the display 451, an audio output module 452, an alarm unit 453, a haptic module 454, and a projector module 455.

The display unit (or module) 451 is typically implemented to visually display (output) information associated with the mobile terminal 400. For instance, if the mobile terminal is operating in a phone call mode, the display will generally provide a user interface (UI) or graphical user interface (GUI) which includes information associated with placing, conducting, and terminating a phone call. As another example, if the mobile terminal 400 is in a video call mode or a photographing mode, the display 451 may additionally or alternatively display images which are associated with these modes, the UI or the GUI.

The display module 451 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 451 can be implemented as the optical transmittive type as well. In this configuration, a user may be able to see an object located at the rear of a terminal body on a portion of the display 451 of the terminal body.

At least two displays 451 can be provided in the mobile terminal 400 in accordance with one embodiment of the mobile terminal 400. For instance, a plurality of displays can be arranged to be spaced apart from each other or to form a single body on a single face of the mobile terminal 400. Alternatively, a plurality of displays can be arranged on different faces of the mobile terminal 400.

If the display 451 and a sensor for detecting a touch action (hereinafter called 'touch sensor') are configured as a mutual layer structure (hereinafter called 'touch screen'), the display 451 is usable as an input device as well as an output device. In this case, the touch sensor can be configured as a touch film, a touch sheet, or a touchpad.

The touch sensor can be configured to convert pressure applied to a specific portion of the display 451 or a variation of capacitance generated from a specific portion of the display 451 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 480. Therefore, the controller 380 is made aware when a prescribed portion of the display 451 is touched.

A proximity sensor 441 can be provided at an internal area of the mobile terminal 400 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 441 is more durable than a contact type sensor and also has utility broader than the contact type sensor.

The proximity sensor 441 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or is stored in the memory 460. During operation, the audio output module 452 outputs audio relating to a particular function (e.g., call received, message received). The audio output module 452 may be implemented using one or more speakers, buzzers, other audio producing devices, and combinations of these devices.

The alarm unit 453 outputs a signal for announcing the occurrence of a particular event associated with the mobile terminal 400. Typical events include a call received, a message received and a touch input received. The alarm unit 453 is able to output a signal for announcing the event occurrence by way of vibration as well as video or audio signal. The video or audio signal can be output via the display 451 or the audio output module 452. Hence, the display 451 or the audio output module 452 can be regarded as a part of the alarm unit 453.

The haptic module 454 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 454 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, at least two haptic modules 454 can be provided in the mobile terminal 300 in accordance with an embodiment of the mobile terminal 400.

The memory 460 is generally used to store various types of data to support the processing, control, and storage requirements of the mobile terminal 400. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 460. Moreover, data for various patterns of vibration and/or sound output in response to a touch input to the touch screen can be stored in the memory 460.

The memory 460 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 400 is able to operate in association with a web storage for performing a storage function of the memory 460 on the Internet.

The interface unit 470 may be implemented to couple the mobile terminal 400 with external devices. The interface unit 470 receives data from the external devices or is supplied with power and then transfers the data or power to the respective elements of the mobile terminal 400 or enables data within the mobile terminal 400 to be transferred to the external devices. The interface unit 470 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 400 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 400 via the corresponding port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals input from the cradle or the power can operate as a signal enabling the mobile terminal 400 to recognize that it is correctly loaded in the cradle.

The controller 480 typically controls the overall operations of the mobile terminal 400. For example, the controller 480 performs the control and processing associated with voice calls, data communications, and video calls. The controller 480 may include a multimedia module 481 that provides multimedia playback. The multimedia module 481 may be configured as part of the controller 480, or implemented as a separate component. Moreover, the controller 480 is able to perform a pattern (or image) recognizing process for recognizing a writing input and a picture drawing input carried out on the touch screen as characters or images, respectively.

The power supply unit 490 provides power required by various components of the mobile terminal 400. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 480.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A wearable device can exchange data with (or cooperate with) another mobile terminal 400. In such a device, the wearable device generally has functionality that is less than the cooperating mobile terminal. For instance, the short-range communication module 414 of a mobile terminal 400 may sense or recognize a wearable device that is near-enough to communicate with the mobile terminal. In addition, when the sensed wearable device is a device which is authenticated to communicate with the mobile terminal 400, the controller 480 may transmit data processed in the mobile terminal 400 to the wearable device via the short-range communication module 414, for example. Hence, a user of the wearable device can use the data processed in the mobile terminal 400 on the wearable device. For example, when a call is received in the mobile terminal 400, the user can answer the call using the wearable device. Also, when a message is received in the mobile terminal 400, the user can check the received message using the wearable device.

FIG. 5a is a perspective view illustrating one example of a watch-type mobile terminal 300 in accordance with another exemplary embodiment.

As illustrated in FIG. 5a, the watch-type mobile terminal 500 includes a main body 501 with a display unit 511 and a band 502 connected to the main body 501 to be wearable on a wrist.

The main body 501 may include a case having a certain appearance. As illustrated, the case may include a first case 501a and a second case 501b cooperatively defining an inner space for accommodating various electronic components. Other configurations are possible. For instance, a single case may alternatively be implemented, with such a case being configured to define the inner space, thereby implementing a mobile terminal 500 with a uni-body.

The watch-type mobile terminal 500 can perform wireless communication, and an antenna for the wireless communication can be installed in the main body 501. The antenna may extend its function using the case. For example, a case including a conductive material may be electrically connected to the antenna to extend a ground area or a radiation area.

The display unit 511 is shown located at the front side of the main body 501 so that displayed information is viewable to a user. In some embodiments, the display unit 511 includes a touch sensor so that the display unit can function as a touch screen. As illustrated, window 5111a is positioned on the first case 501a to form a front surface of the terminal body together with the first case 501a.

The illustrated embodiment includes audio output module 512, a camera 521, a microphone 522, and a user input unit 523 positioned on the main body 501. When the display unit 5111 is implemented as a touch screen, additional function keys may be minimized or eliminated. For example, when the touch screen is implemented, the user input unit 323 may be omitted.

The band 502 is commonly worn on the user's wrist and may be made of a flexible material for facilitating wearing of the device. As one example, the band 502 may be made of fur, rubber, silicon, synthetic resin, or the like. The band 502 may also be configured to be detachable from the main body 501. Accordingly, the band 502 may be replaceable with various types of bands according to a user's preference.

In one configuration, the band 502 may be used for extending the performance of the antenna. For example, the band may include therein a ground extending portion (not shown) electrically connected to the antenna to extend a ground area.

The band 502 may include fastener 502a. The fastener 502a may be implemented into a buckle type, a snap-fit hook structure, a Velcro® type, or the like, and include a flexible section or material. The drawing illustrates an example that the fastener 302a is implemented using a buckle.

FIG. 5b is a perspective view illustrating one example of a glass-type mobile terminal 550 according to another exemplary embodiment.

The glass-type mobile terminal 550 can be wearable on a head of a human body and provided with a frame (case, housing, etc.) therefor. The frame may be made of a flexible material to be easily worn. The frame of mobile terminal 550 is shown having a first frame 551 and a second frame 552, which can be made of the same or different materials.

The frame may be supported on the head and defines a space for mounting various components. As illustrated, electronic components, such as a control module 580, an audio output module 562, and the like, may be mounted to the frame part. Also, a lens 553 for covering either or both of the left and right eyes may be detachably coupled to the frame part.

The control module 580 controls various electronic components disposed in the mobile terminal 550. The control module 580 may be understood as a component corresponding to the aforementioned controller 480. FIG. 5b illustrates that the control module 580 is installed in the frame part on one side of the head, but other locations are possible.

The display unit 561 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 550, the display unit 561 may be located to correspond to either or both of the left and right eyes. FIG. 5b illustrates that the display unit 561 is located on a portion corresponding to the right eye to output an image viewable by the user's right eye.

The display unit 561 may project an image into the user's eye using a prism. Also, the prism may be formed from optically transparent material such that the user can view both the projected image and a general visual field (a range that the user views through the eyes) in front of the user.

In such a manner, the image output through the display unit 561 may be viewed while overlapping with the general visual field. The mobile terminal 550 may provide an augmented reality (AR) by overlaying a virtual image on a realistic image or background using the display.

The camera 571 may be located adjacent to either or both of the left and right eyes to capture an image. Since the camera 571 is located adjacent to the eye, the camera 421 can acquire a scene that the user is currently viewing.

In the drawings, the camera 571 may be positioned at the control module, but not limited to therein. The camera 571 may be installed in the fame part, multiple cameras may be used to acquire a stereoscopic image.

The glass-type mobile terminal 550 may include user input units 573a and 573b, which can each be manipulated by the user to provide an input. The user input units 573a and 573b may employ techniques which permit input via a tactile input. Typical tactile inputs include a touch, push, or the like. The user input units 573a and 573b are shown operable in a pushing manner and a touching manner as they are located on the frame part and the control module 580, respectively.

If desired, mobile terminal 550 may include a microphone which processes input sound into electric audio data, and an audio output module 562 for outputting audio. The audio output module 562 may be configured to produce audio in a general audio output manner or an osteoconductive manner. When the audio output module 562 is implemented in the osteoconductive manner, the audio output module 562 may be closely adhered to the head when the user wears the mobile terminal 550 and vibrate the user's skull to transfer sounds.

Figure 6:
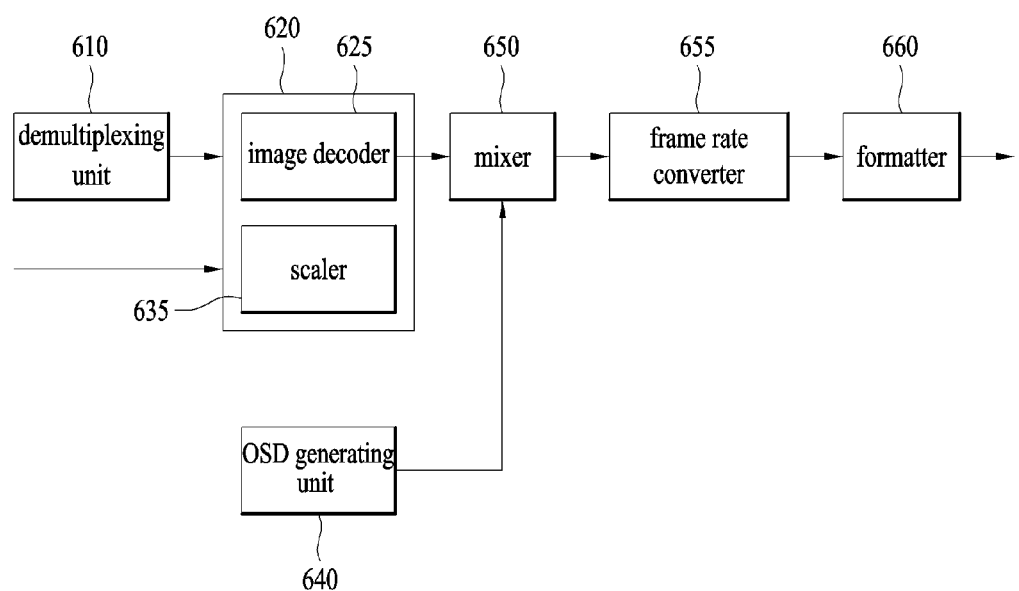
FIG. 6 is a diagram illustrating an inputter connected to the digital device of FIGS. 2 to 4 according to an embodiment of the present invention.

FIG. 6 is a block diagram for explanation of detailed configurations of a controller of FIGS. 2 to 5 according to an embodiment of the present invention.

An example of the controller may include a demultiplexer 610, an image processor 620, an OSD generator 640, a mixer 650, a frame rate converter (FRC) 655, and a 3D formatter (or an Output formatter) 660. The controller further includes a voice processing unit (not shown) and a data processing unit (not shown).

The demultiplexer 610 can demultiplex an input stream signal into an MPEG-2 TS image, an audio signal and a data signal, for example. Here, the stream signal inputted to the demultiplexer 610 is a stream signal output from a tuner, a demodulator or an external device interface.

The image processor 620 can process a demultiplexed image signal. For this, the image processor 620 includes a video decoder 625 and a scaler 635.

The video decoder 625 can decode the demultiplexed image signal and the scaler 635 can scale the resolution of the decoded image signal such that the image signal can be displayed.

The video decoder 625 can support various Standards. For instance, the video decoder 625 performs a function of MPEG-2 decoder if a video signal is coded with a MPEG-2 standard. And, the video decoder 625 performs a function of H.264/H.265 decoder if a video signal is coded with a DMB (Digital Multimedia Broadcasting) method or H.264/H.265 standard.

The image signal decoded by the image processor 620 may be input to the mixer 650.

The OSD generator 640 may generate OSD data automatically or according to user input. For example, the OSD generator 640 may generate data to be displayed on the screen of an output unit in the form of an image or text on the basis of a control signal of a user input interface. OSD data generated by the OSD generator 640 may include various data such as a user interface image of the digital device, various menu screens, widget, icons, and information on ratings. The OSD generator 640 can generate a caption of a broadcast image or data for displaying EPG based broadcast information.

The mixer 650 may mix the OSD data generated by the OSD generator 640 and the image signal processed by the image processor 620. The mixer 650 may provide the mixed signal to the 3D formatter 660. By mixing the decoded image signal and the OSD data, OSD may be overlaid on a broadcast image or external input image.

The frame rate converter (FRC) 655 may convert a frame rate of input video. For example, the frame rate converter 655 can convert the frame rate of an input 60 Hz video to a frame rate of 120 Hz or 240 Hz, according to an output frequency of the output unit. The frame rate converter 655 may be bypassed when frame conversion is not executed.

The formatter 660 may change the output of the frame rate converter 655, which is input thereto, into a form suitable for the output format of the output unit. For example, the 3D formatter 660 can output an RGB data signal. In this case, this RGB data signal can be output according to low voltage differential signaling (LVDS) or mini-LVDS. When a 3D image signal output from the frame rate converter 655 is input to the 3D formatter 660, the 3D formatter 660 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

The digital device is exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital device is an example of image signal processors which process an image stored therein or an input image. Other examples of the image signal processors may include a set-top box (STB) which does not include the display unit 380 and the audio output unit 385 shown in FIG. 3, a DVD player, a Blu-ray player, a game device, a computer, etc.

The digital devices according to an embodiment of the present invention, not depicted, can be connected to input means which are implemented in various form.

For example, a front panel or control means (or input means) embedded with the digital device are used to control the digital device.

Meanwhile, control means, as a User Interface Device (UID) capable of wired/wireless communication, include a remote controller, a keyboard, a pointing device, a touch-pad and the like, which are implemented for mainly controlling the digital device, as well as a control mean dedicated to an external input which is connected to the digital device. In addition, a smart phone, a tablet PC and the like, which are not control the digital device, is included in the control means through mode conversion. Here, in the present disclosure, the control mean is a pointing device, but not limited to thereof. Input means can communicate with the digital device by adopting at least one communicating protocol such as a Bluetooth, a RFID, an IrDA, a UWB, a Zigbee, a DLNA, a RS and the like, if necessary.

The remote controller may refer to a typical input mean comprising various key buttons for controlling the digital device. The pointing device may include a gyro sensor mounted therein to sense vibration of a user's hand or rotation. That is, the pointing device can provide a pointer corresponding to the screen of the digital device based on motions of the user, pressure, rotation and the like through an adopted Gyro sensor, etc. The pointing device can be called a magic remote controller, a magic controller, etc. The keyboard have been implemented so that it is similar to a keyboard of a personal computer (PC) in order to conveniently input text because the traditional remote control is not sufficient enough to control the digital device since the digital device offers more than just providing broadcast programs as it did before, but has advanced into an intelligent integrated digital device providing web browser, application, social network service (SNS) and the like. Meanwhile, the control means such as the remote controller, the pointing device, the keyboard, and the like, include a touch pad, if necessary, and then it can be used to input a text, move a pointer, enlarge/shorten a picture and video and so on.

The digital device described in the present specification uses a Web OS as a platform. Hereinafter, a web OS based process or algorithm may be performed by the controller of the above-described digital device. The controller includes the controllers as wide concepts. Accordingly, hereinafter, a component for processing Web OS based services, applications, content, etc., including software, firmware or hardware in a digital device is referred to a controller.

Such a Web OS based platform may improve development independency and functional extensibility by integrating services, applications, etc. based on a Luna-service bus, for example, and increase application development productivity based on web application framework. In addition, system resources, etc. may be efficiently used via a Web OS process and resource management to support multi-tasking.

A Web OS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
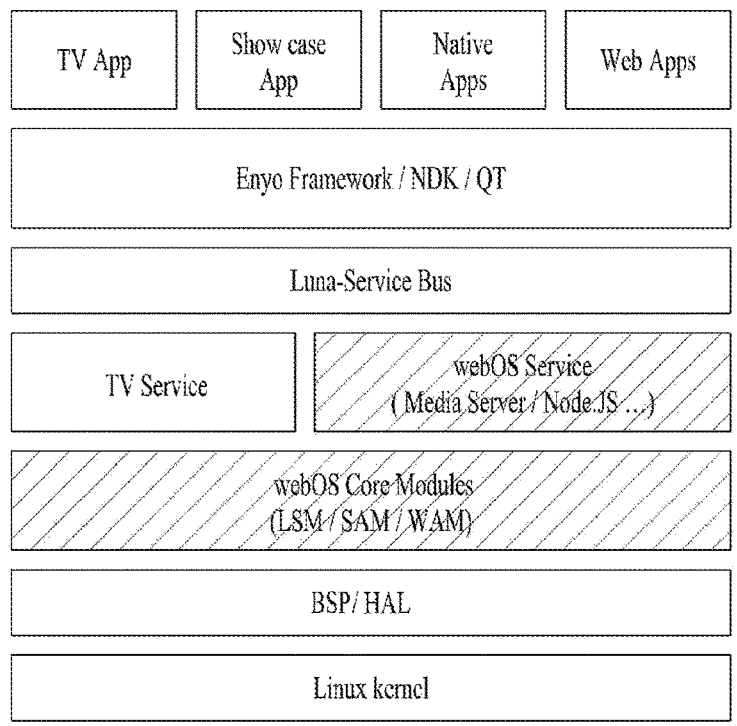
FIG. 7 is a diagram for explanation of a web OS architecture according to an embodiment of the present invention.

FIG. 7 is a diagram illustrating Web OS architecture according to one embodiment of the present invention.

The architecture of a Web OS platform will now be described with reference to FIG. 7.

The platform may be largely divided into a kernel, a Web OS core platform based on a system library, an application, a service, etc.

The architecture of the Web OS platform has a layered structure. OS is provided at a lowest layer, system library(s) are provided at a next highest layer and applications are provided at the highest layer. First, the lowest layer is an OS layer including a Linux kernel such that Linux is included as an OS of the digital device. At layers higher than the OS layer, a board support package (BSP)/hardware abstraction layer (HAL) layer, a Web OS core modules layer, a service layer, a Luna-service bus layer and an Enyo framework/ native developer's kit (NDK)/QT layer are sequentially provided. At the highest layer, an application layer is provided. One or more layers of the above-described Web OS layered structure may be omitted and a plurality of layers may be combined to one layer and one layer may be divided into a plurality of layers. The Web OS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application may use a service via a Luna-service bus. A service may be newly registered via a bus and the application may detect and use a desired service.

The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and Javascripts, and is composed of the Node.JS service used via Node.JS.

The application layer may include all applications supportable by a digital device, such as a TV application, a showcase application, a native application, a web application, etc.

Applications on the Web OS may be divided into a web application, a palm development kit (PDK) application, a Qt Meta Language or Qt Modeling Language (QML) application, etc. according to implementation methods. The web application is based on a WebKit engine and is performed on WAM runtime. Such a web application is based on Enyo framework or may be developed and performed based on general HTML5, cascading style sheets (CSS) and Javascripts. The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance. The QML application is a native application based on Qt and includes basic applications provided along with the Web OS platform, such as card view, home dashboard, virtual keyboard, etc. QML is a markup language of a script format, not C++. The native application is an application which is developed and compiled using C/C++ and is executed in the binary form and has an advantage such as high execution speed.

Figure 8:
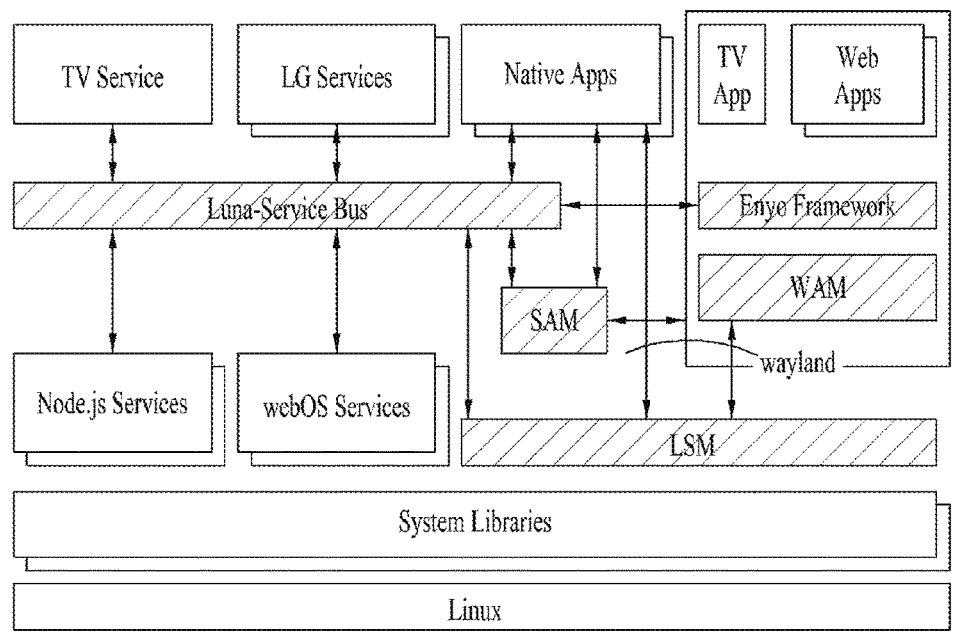
FIG. 8 is a diagram for explanation of an architecture of a web OS device according to an embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8. Referring to FIG. 8, services, applications and Web OS core modules are included on a system OS (Linux) and system libraries and communication therebetween may be performed via a Luna-service bus.

Node.JS services based on HTML5 such as e-mail, contact or calendar, CSS, Javascript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window. The LSM supports implementation of a system UI based on a QML and improves development productivity. QML UX may easily configure a view using a screen layout and UI components based on model view controller (MVC) and easily develop code for processing user input. An interface between the QML and the Web OS component is achieved via a QML extensibility plug-in and graphic operation of an application may be based on Wayland protocol, luna-service call, etc. The LSM is an abbreviation for a Luna surface manager and functions as an application window compositor. The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager. The LSM supports multiple window models and may be simultaneously executed in all applications as a system UI. The LSM may support launcher, Recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
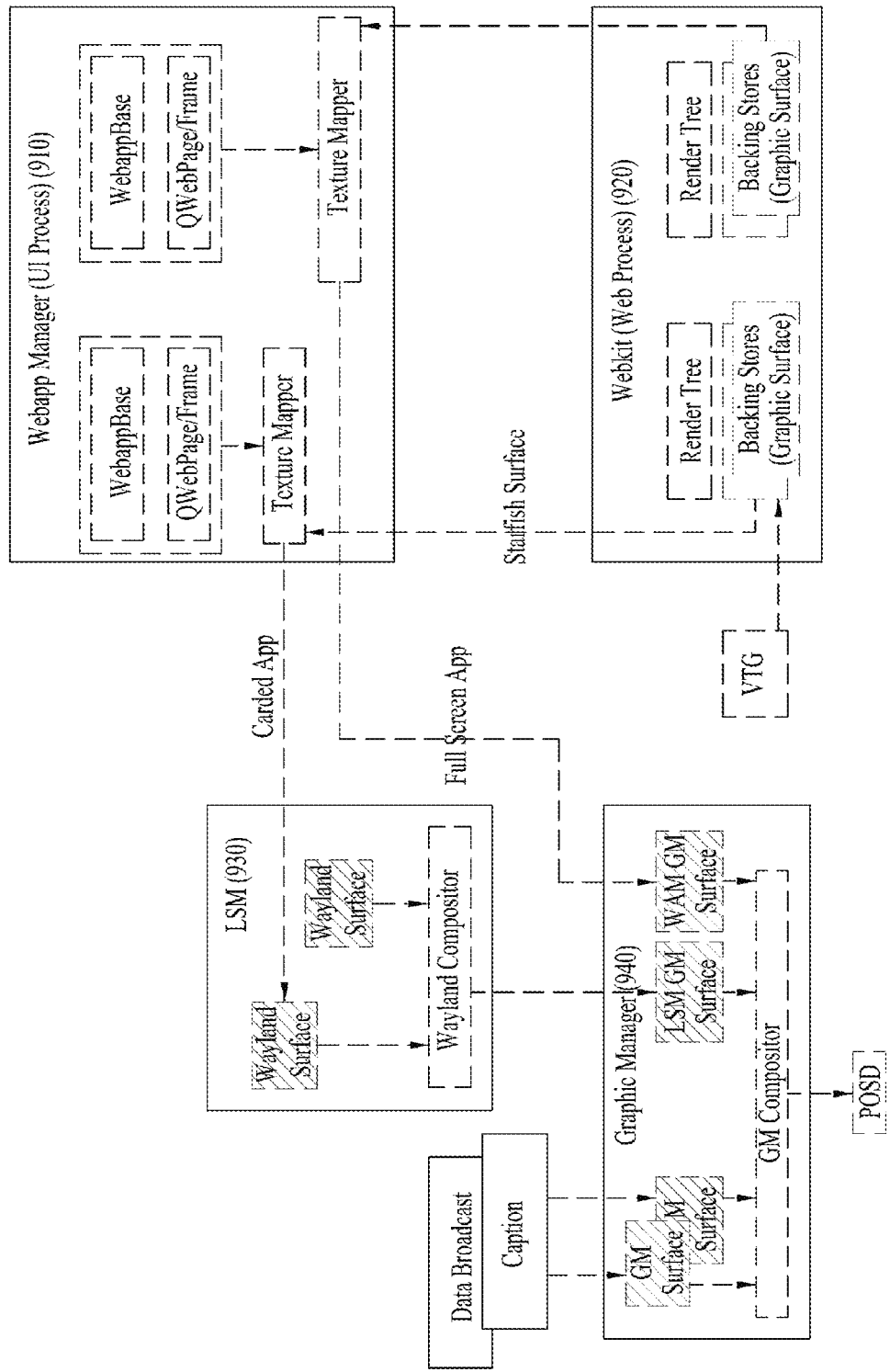
FIG. 9 is a diagram for explanation of a graphic composition flow in a web OS device according to an embodiment of the present invention.

FIG. 9 is a diagram illustrating a graphic composition flow in a Web OS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a full-screen application. The web application manager 910 receives an application generated by the WebKit 920 in order to share a graphic processing unit (GPU) memory for graphic management between the UI process and the web process and delivers the application to the LSM 930 if the application is not a full-screen application. If the application is a full-screen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The full-screen application is directly delivered to the graphics manager 940 without passing through the LSM 930 as described above and is processed in the graphics manager compositor via the WAM GM surface. The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
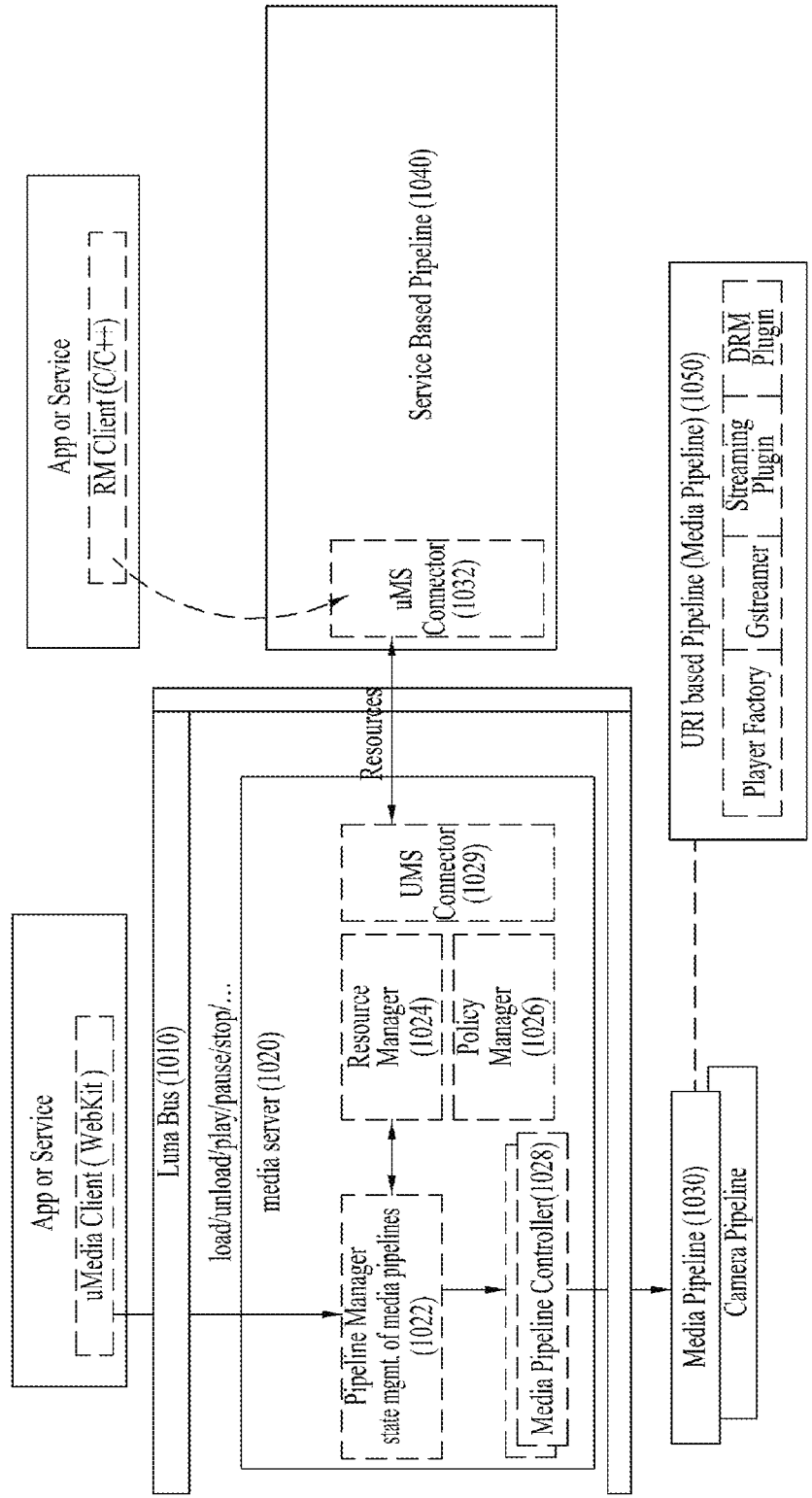
FIG. 10 is a diagram for explanation of a media server according to an embodiment of the present invention.
Figure 11:
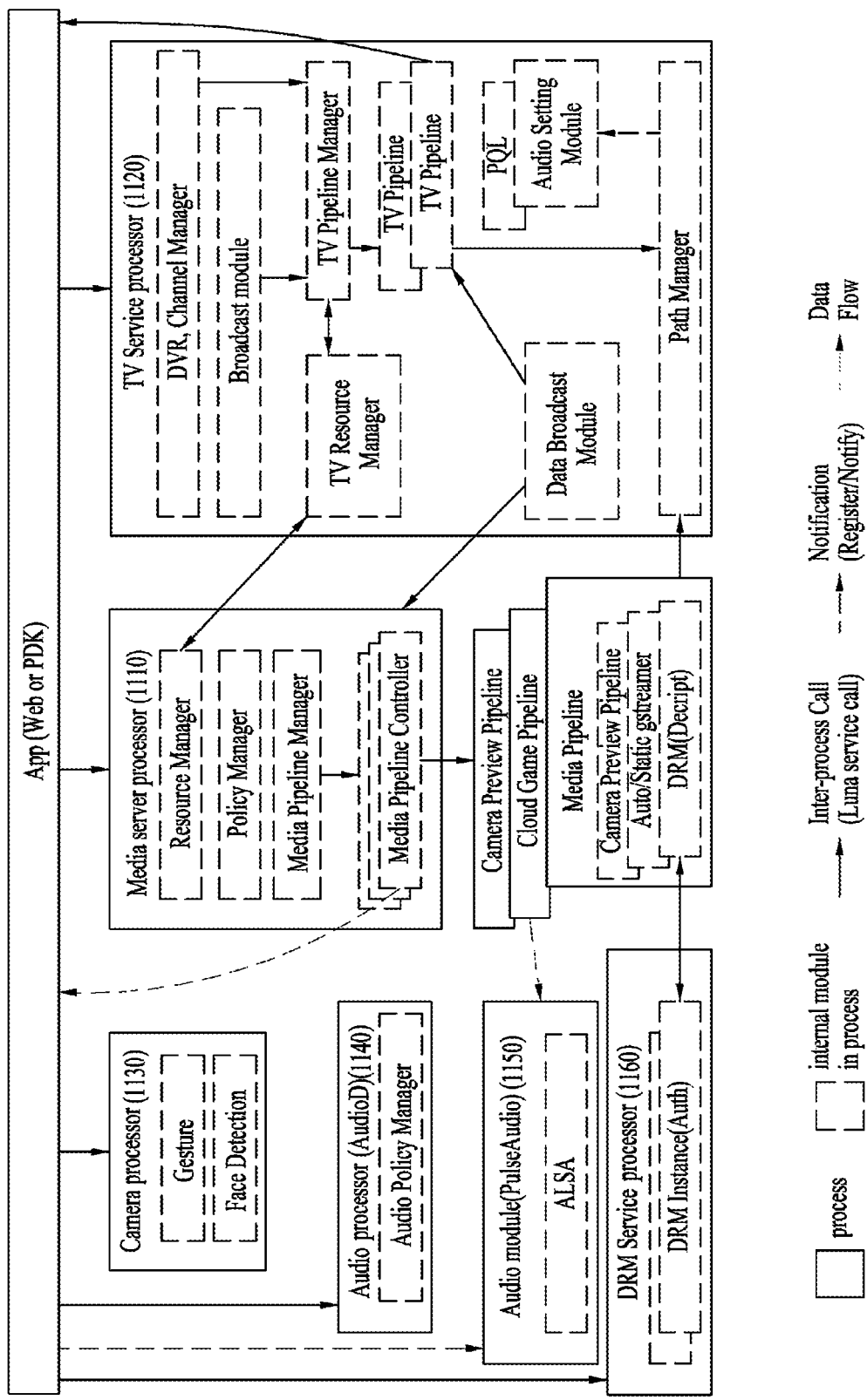
FIG. 11 is a diagram for explanation of a block diagram of a media server according to an embodiment of the present invention.
Figure 12:
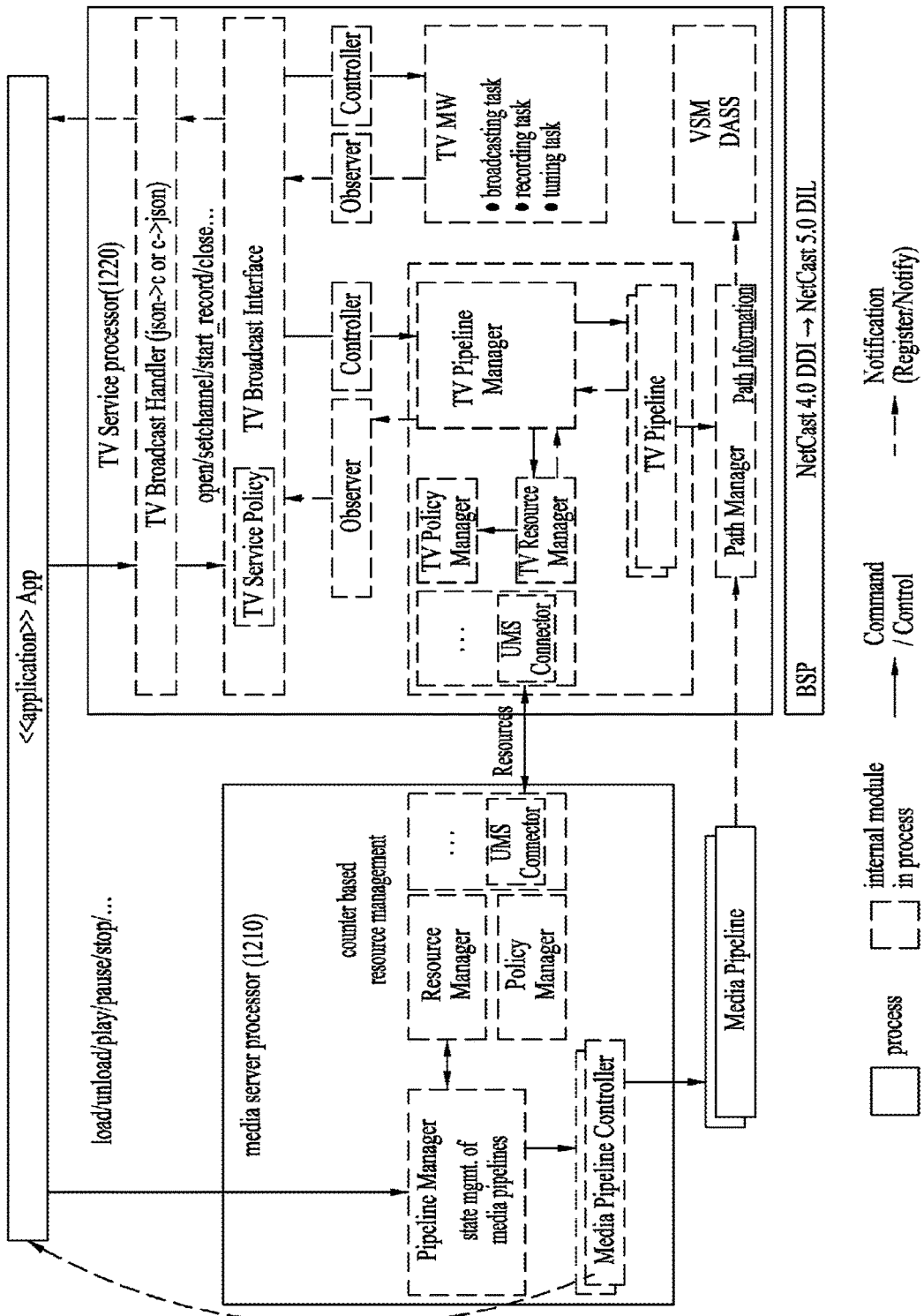
FIG. 12 is a diagram for explanation of a relationship between a media server and a TV service according to an embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (e.g., Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media. The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management. The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc. The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The pipeline manager 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026. The pipeline manager 1022 requests to generate a pipeline for operation according to the request of the uMedia client from the media pipeline controller 1028, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smartshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used. A method of using a service in PDK may be used. Alternatively, a method of using in existing CP may be used. For backward compatibility, plug-in of an existing platform may be extended and used based on Luna.

Lastly, an interface method using a non-Web OS may be used. In this case, a Luna bus may be directly called to perform interfacing.

Seamless change is processed by a separate module (e.g., TVwin) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (M/W), a path manager and a BSP (NetCast). The service processor may mean a module including a TV pipeline manager, a TV resource manager, a TV policy manager, a USM connector, etc., for example.

In the present disclosure, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

Hereinafter, a process of the TV broadcast interface within the TV service processor 1220 of FIG. 12 is more specifically described as follows.

The TV broadcast interface can process a controlling function of the TV service processor 1220. The TV broadcast interface requests to generate a pipeline to the TV pipeline manager, and then the TV pipeline manager generates the requested TV pipeline and requests a resource to TV source manager. TV source manger requests the resource to the media server and acquires the resource from the media server through the uMS, and then return the acquired resource to the TV pipeline manager.

The TV pipeline manager arranges the returned resources in the generated TV pipeline and registers pipeline information to the path manager. Then, the TV pipeline manager returns a resultant to the TV pipeline manager. The TV pipeline manager returns the pipeline to the TV broadcast interface.

Then, the TV broadcast interface requests a channel change by communicating with TV middleware (MW), and returns a resultant to the TV MW.

The TV service can be processed via as described above process.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example.

In the disclosure, the resource manager included in the media server processor 1110/1210, for instance, can manage the resource using a counter base.

The media server design in Web OS platform will be more specifically described as follows.

The media server is a media framework for supporting to interface third-party multimedia pipeline(s) with the Web OS platform. The media server can enable the resource(s) to control, manage, isolate, deconflict, and the like for complaint of the third-party multimedia pipeline(s). Such media server can provide general API to enable application to reproduce a media, and be a platform module for consistently managing hardware resources and policies. Also, the media server's design is for reducing a complexity using a generalization of media process and a division of related modules.

The key of the media server is, for example, providing an integration of both a service interface and a Web OS UI. For this, the media server can control the resource manager, the policy manager, and the pipeline manager and provides API access according to a resource manager query.

The uMS connector is a main API and a SDK which interface the client media pipeline processes with the media server. The uMS connector is an event as an interface and a message. The client media pipelines can implement client media pipeline status events to enable load, play, pause, seek, stop, unload, release_resource, acquire_resource, and the like.

The uMedia API provides C, and C++ API to the media server.

The media resource manager can provide a method of describing uses of media hardware resources and pipeline client resource to a simple configuration file. The media resource manager can provide necessary performance and information for implementing default or third-party media policy management.

The media policy manager can be activated if the resource manager rejects the media pipeline because of a resource conflict. The policy manager can provide a consistent API and SDK for implementing a third-party policy manager. The policy manager can support media pipelines matched with LRU (Least Recently Used) and be used for one or more conflicted resources.

The pipeline manager can track and maintain client media pipelines. The pipeline controller can provide a consistent API to the pipeline manager for controlling and managing client media pipelines.

The media server can communicate with the resource manager through a library call, and the resource manager can communicate with the media pipeline through a luna service bus.

The media resource manager can configure a total configurable file for describing media hardware and media client pipelines, detect a resource conflict, and collect necessary information for implementing a media policy management.

The media policy manger can read a policy_select field and a policy_action field of the resource configuration file, and a resource contention can try to select an active pipeline as described by the policy_select field and issue a problem of outgoing/selected pipelines based on the policy_action field. The selection function can become a parameter supported by the pipeline configuration setting entry. The policy action is an unload and a release. All pipelines can support an unload command for releasing a specific resource. The pipeline can additionally support the unload command to release the specific resource. Here, the release command is for fast switch pipelines competing with common resources and the unload command of all resources cannot be required to incoming pipeline and deconflict.

The pipeline manager can manage the pipeline controller. The pipeline manager can maintain a running queue of the pipeline controller and provide a unique indexing for incoming message from applications via media server.

The pipeline controller can maintain a relationship of a related media client pipeline process. The pipeline controller can maintain all related status, and can provide a media client pipeline control interface as a pipeline manager. The pipeline client process is an individual process using the uMS connector to provide a control interface to the media server and the like. The pipeline (client) media technology (Gstreamer, Stage Fright) can be an independent and perfectly decoupled with from the media server manager and services.

Hereinafter, a digital device and a method for controlling the digital device according to the present invention will be described in more detail.

A smart TV is generally controlled by a remote controller, which is paired with the TV during its fabrication and provided accordingly. Recently, by adding a voice interface to the remote controller, the user has now become capable of controlling the TV through the voice interface of the remote controller. This specification intends to provide a method for controlling the smart TV through a neighboring device, such as a smart phone, a tablet PC, a wearable device, and so on, without having to use the voice interface of the remote controller. Hereinafter, as described above, although the present invention will be described based upon an exemplary embodiment of a device control performed mainly through voice, i.e., voice command, the scope of the present invention will not be limited only to this, and the present invention may also be control devices by using other methods, such as gesture, and so on.

In other words, the related art digital device was generally paired with a fixed controlling means and controlled by the fixed controlling means. However, in case of using this method, when the user is required to locate the fixed controlling means, or when the user is required to move to a location where an inputted voice can be recognized by the voice interface of the controlling means, and so on, such inconvenience has caused a decrease in efficiency. Therefore, even if the controlling means does not correspond to the above-described fixed controlling means, by using a digital device that is paired with the targeted device as a controlling device, this specification may achieve convenience in the control of the targeted device by minimizing the movement of the user in order to control the targeted device, i.e., by allowing the user to use a neighboring controlling device as it is without any modification. At this point, generally, in case of using a mobile device, the controlling device has an advantage of being capable of performing the function of a controlling device without having to perform installation, execution, and so on, of a controlling application, such as a separate remote application for controlling the targeted device. For example, in the related art digital device, even if another voice-recognizable device exists, due to its inability of being connected to the digital device, or due to the limitation in the types of devices that can be connected to the digital device, the usefulness (or utility) of the related art digital device was degraded, and, even if a device that can be connected with the digital device via Miracast by the user exists, there was an inconvenience in using the corresponding function, in that the user was required to separately set up each device and manually connect each device to the related art digital device.

Therefore, hereinafter, this specification intends to provide a method for controlling a targeted device due to its simplicity that does not require the user to separately move in order to input a control command through diverse controlling devices that belong to a network instead of a remote controller that is predetermined to the targeted device.

The above-mentioned targeted device signifies a concept including all of the above-described digital devices, and, for example, the targeted device may correspond to at least any one of a digital TV, a washing machine, an air conditioner, a refrigerator, a PC, a smart phone, a tablet PC, a wearable device, and so on. However, the targeted device that will be described below will be described by giving a digital TV as its example in order to facilitate the understanding of the present invention and to simplify the description of the present invention.

The above-described controlling device refers to a digital device other than a fixed controlling means, e.g., TV remote controller, and so on, which is paired with the targeted device during its fabrication. Such controlling device may include all of a digital TV, a PC, a smart phone, a tablet PC, a wearable device, and so on. Meanwhile, the controlling device is not required to separately function solely for the control of the targeted device, and the controlling device may control the targeted device by being inter-connected to at least one other controlling device. At this point, the fixed controlling means may be used on the inter-connected device. Hereinafter, in order to facilitate the understanding of the present invention and to simplify the description of the present invention, although description will be made by giving a wearable device as an example of the controlling device and by giving a smart phone as an example of the linked controlling device, the present invention will not be limited only to this. Meanwhile, among various wearable devices, in this specification, description will be made on the wearable device by giving a smart watch as its example.

In other words, in this specification, a targeted device is controlled through a controlling device belonging to a network instead of a fixed controlling means, such as the related art remote controller. At this point, it will suffice for the controlling device to simply belong to a network and to be paired with the targeted device, and, then, the controlling device controls the targeted device through a specific interface, e.g., voice recognition interface or gesture recognition interface, and so on, without having to perform downloading, installation, execution, and so on, of a separate program or application, and so on, in order to control the targeted device.

Hereinafter, the diverse exemplary embodiments of the present invention will be described in detail with reference to the accompanying drawings in the following description.

Figure 13:
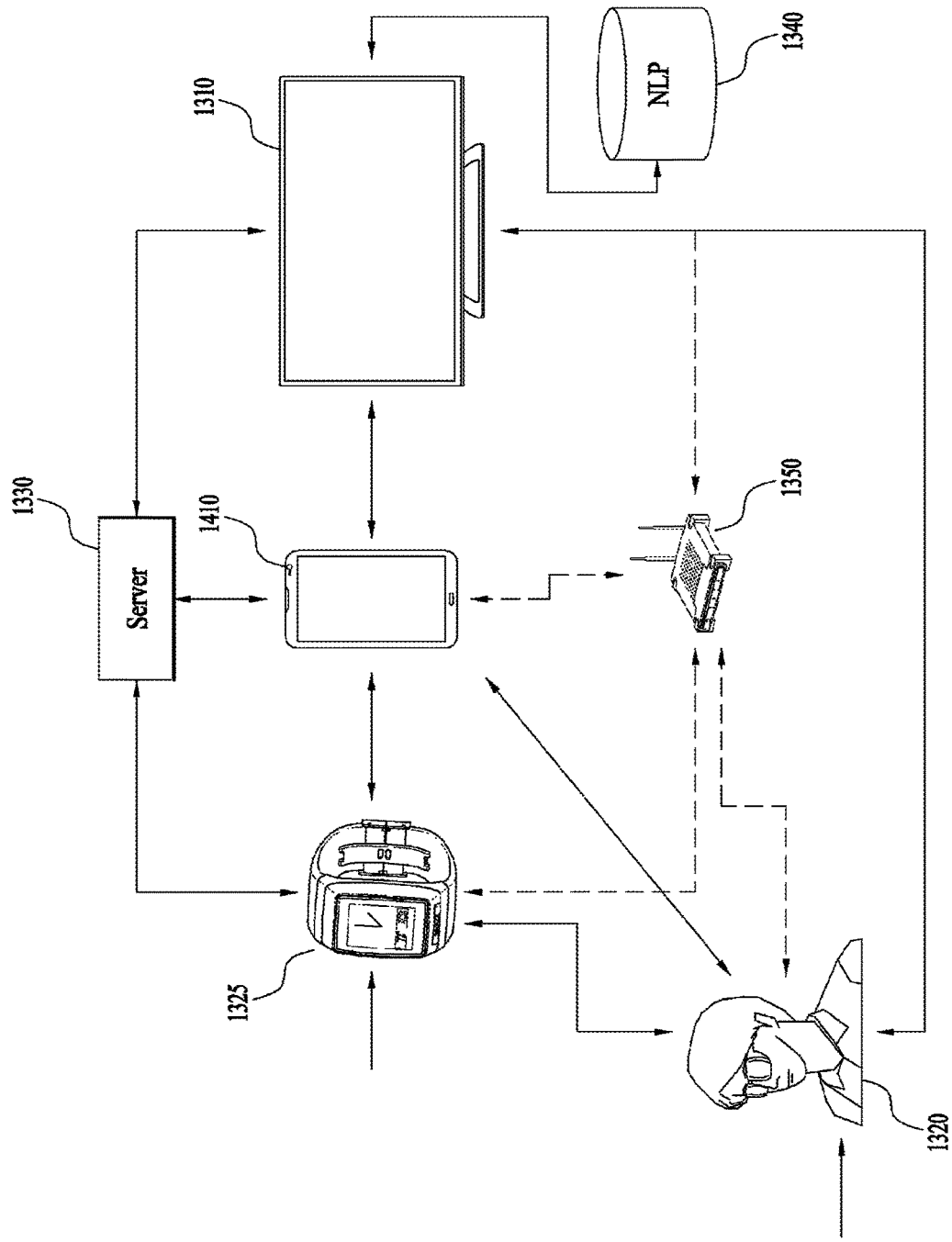
FIGS. 13 and 14 illustrate drawings for describing a device controlling system including a targeted device and a controlling device according to the present invention.
Figure 14:
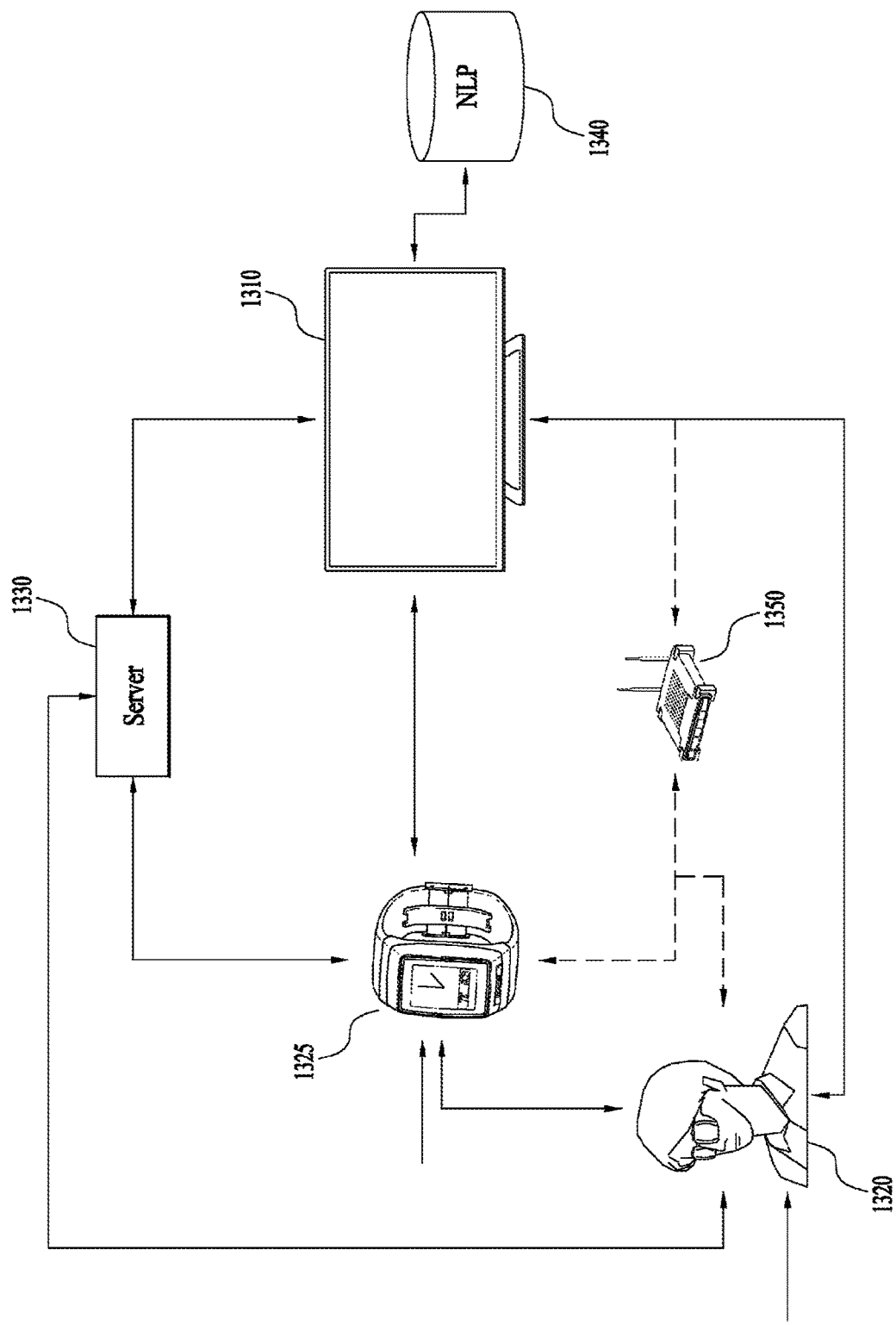

FIGS. 13 and 14 illustrate drawings for describing a device controlling system including a targeted device and a controlling device according to the present invention. Herein, the difference in configuration between FIG. 13 and FIG. 14 corresponds to the presence and absence of an inter-connected controlling device (1410).

First of all, the device controlling system will be described with reference to FIG. 13. Referring to FIG. 13, the device controlling system includes a targeted device (1310) and controlling devices (1320, 1325). The device controlling system may further include at least one of a server (1330), a relay station (1350), and so on, in order to support pairing, data communication, and so on, between the targeted device (1310) and the controlling devices (1320, 1325).

As a digital TV, the targeted device (1310) performs an operation respective to the control command that is being inputted from the controlling devices (1320, 1325). Herein, the respective operation includes the execution of all of the original functions of a digital TV being equipped with a web OS platform, such as changing channels, changing the volume, executing a web browser, calling a menu, playing, stopping, and ending content, and so on. Meanwhile, the targeted device (1310) may, for example, further include an NLP (1340). In case the control command being inputted to the targeted device (1310) corresponds to voice data, the NLP (1340) corresponds to a processing unit for identifying the voice data in order to identify the control command and to perform the function respective to the identified control command. Accordingly, in case the control command does not correspond to voice data, as described above, the NLP (1340) may not be needed or may be replaced with or modified to a processing component suitable for the corresponding control command.

Two different types of wearable devices, such as smart glasses (1320) and a smart watch (1325) are illustrated as the controlling devices, and the controlling device receives a voice input or gesture input of the user. Although two different controlling devices are shown in FIG. 13 and FIG. 14, both of the controlling devices are not necessarily required to be used, and, therefore, the targeted device may be controlled through any one of the controlling devices.

When an external voice signal is received through a voice recognition interface (not shown) equipped in the controlling devices (1320, 1325), the controlling devices (1320, 1325) convert the received voice signal to digital voice data and, then, transmit the converted data to the targeted device (1310).

Diverse paths may be used during the process of having the voice signal of the user, which is received by the controlling devices (1320, 1325), by finally transmitted as a control command of the targeted device (1310). FIG. 13 and FIG. 14 may represent the respective exemplary embodiments.

First of all, in order to allow the device controlling system according to the present invention to operate normally, a pairing process between the targeted device (1310) and the controlling devices (1320, 1325) should be performed. At this point, the server (1330) and/or the relay station (1350) of FIG. 13 and FIG. 14 may also be paired. Meanwhile, although the pairing may be established in accordance with the diverse communication protocols that are described above, for simplicity, an example of performing pairing by using a Bluetooth method will be given as an example in the following description. Meanwhile, not all of the device configurations within the device controlling system are required to be paired by Bluetooth pairing, and it will suffice that pairing is established based upon a communication protocol best-fitting the characteristic of each device. However, for simplicity, it will be assumed that at least the targeted device (1310) and the controlling devices (1320, 1325) within the device controlling system are paired by Bluetooth pairing. In the case of FIG. 14, Bluetooth pairing is performed between the controlling devices (1320, 1325), the inter-connected controlling device (1410), and the targeted device and the controlling devices that intend to share the display screen between one another shall be capable of supporting a device inter-connection service, such as Miracast. As described above, with respect to Bluetooth pairing, all cases using profiles that are capable of delivering text data, including BPP (Basic Printing Profile), MAP (Message Access Profile), and so on, as the Bluetooth profile are included. Meanwhile, for Bluetooth pairing, Bluetooth classic and Bluetooth Low Energy are both available, and, the actual data communication may be performed by using all profiles including SPP (Serial Port Profile).

In FIG. 13, the controlling devices (1320, 1325) convert the inputted voice signal to digital voice data, and, then, by directly performing a STT (Speech to Text) conversion operation on the digital voice data to text form data, the controlling devices (1320, 1325) may directly transmit the converted text form data as the control command of the targeted device (1310).

Herein, the STT processing may be directly performed by the controlling devices (1320, 1325) or may be performed by the server (1330) after sending the data to the server (1330). In case the STT conversion operation is performed by the server (1330), the server (1330) may return the STT converted text data to the controlling devices (1320, 1325), or the server (1330) may directly transmit the STT converted text data to the targeted device (1310). When the text data are returned, the controlling devices (1320, 1325) output the returned text data on the display screens of the controlling devices (1320, 1325), and, then, after verifying whether or not the text data are converted to correspond to the user's selection, i.e., voice signal, the controlling devices (1320, 1325) may transmit the returned text data to the targeted device (1310). At this point, if the converted text data do not correspond to the voice signal, the controlling devices (1320, 1325) perform communication with the server (1330), so that the STT conversion procedure can be carried out once again, or so that the voice signal can be inputted once again.

Meanwhile, the text data that are acquired from the controlling devices (1320, 1325) may be transmitted through a route via relay station (1350) instead of the direct route or the route via server. As a gateway, when required, such relay station (1350) may adequately convert the inputted text data and may deliver the converted text data to the targeted device (1310). Alternatively, in case the controlling devices (1320, 1325) are not directly paired with the targeted device (1310), and, in case the relay station (1350) is paired with the targeted device (1310), the relay station (1350) may also transmit the control command to the corresponding targeted device.

In the case shown in FIG. 14, the basic processing procedure is very similar to the procedure of FIG. 13, which is described above. In FIG. 14, unlike in FIG. 13, the inter-linked controlling device (1410) is further included, which contributes to the above-described processing procedure.

For example, when the audio signal received from the controlling devices (1320, 1325) is converted to digital voice data and then delivered to the inter-connected controlling device (1410), or when the inputted audio signal is directly delivered to the inter-connected controlling device (1410), the inter-connected controlling device (1410) performs the function of processing the received audio signal and delivering the processed signal to the targeted device (1310).

In FIG. 13, the received voice signal is directly converted to digital voice data and processed with STT conversion (there are cases when this is processed by the server) and then delivered to the targeted device (1310) by the controlling devices (1320, 1325). However, in FIG. 14, the digital voice data conversion operation or/and STT conversion operation may be processed by the inter-connected controlling device (1410).

The inter-connected controlling device (1410) may directly perform STT conversion processing, and the inter-connected controlling device (1410) may also receive STT converted data, which are delivered to the server (1330) and then returned after being processed STT conversion, and may then deliver the returned data to the targeted device (1310).

The targeted device (1310) processes the inputted text data through the NLP (1340), and, then, the targeted device (1310) performs operations respective to the voice signal, which is initially received from the controlling devices (1320, 1325), based upon the data that are returned from the NLP (1340). At this point, prior to being operated based upon the returned data, the targeted device (1310) may output data corresponding to the voice signal on its display screen in advance and may, then, be capable of performing the respective operations in accordance with the user's selection. The respective data may match with the data processed with STT conversion in accordance with the voice signal or may not match with the processed data. In case of the latter, even if the data do not match, selection data corresponding to the menus, functions, and so on, respective to the data may be outputted.

As described above, the targeted device is required to be capable of identifying the text data being inputted from or through the controlling device as a control command, or text data for simple display, or text data that are intended for noise processing. Otherwise, since resource is required to be allocated and the respective processing is to be carried out in order to perform operations respective to each set of inputted text data, problems of power consumption and system efficiency may occur.

Accordingly, in the controlling device, the text data after STT processing may include identification data allowing the corresponding text data to be identified, for example, as a control command for controlling the targeted device. Therefore, the targeted device parses only a header of the text data being inputted from the controlling device, and, if identification data exist, and, after parsing the existing identification data, if the corresponding text data corresponds to a control command, the respective controlling operations are performed, and, if the corresponding text data correspond to a voice display text data, the corresponding text data may be outputted to a predetermined area in the display screen. Additionally, when the above-described process is based upon the parsed identification data, in case the corresponding text data do not correspond to a control command or display text data, the corresponding text data may be disregarded (or ignored) without being decoded.

Figure 15:
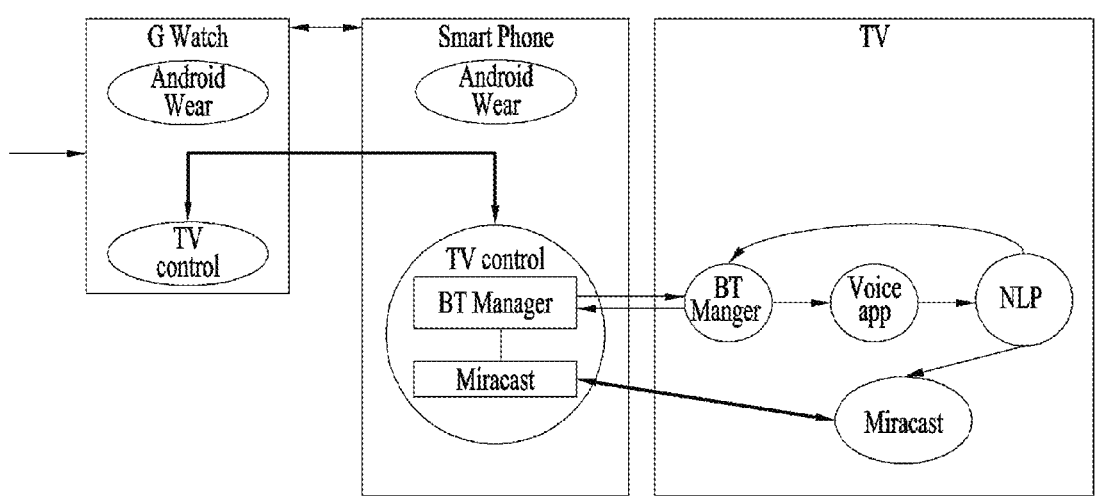
FIG. 15 illustrates a drawing for describing internal configuration modules of device controlling system components based upon FIG. 14.
Figure 16:
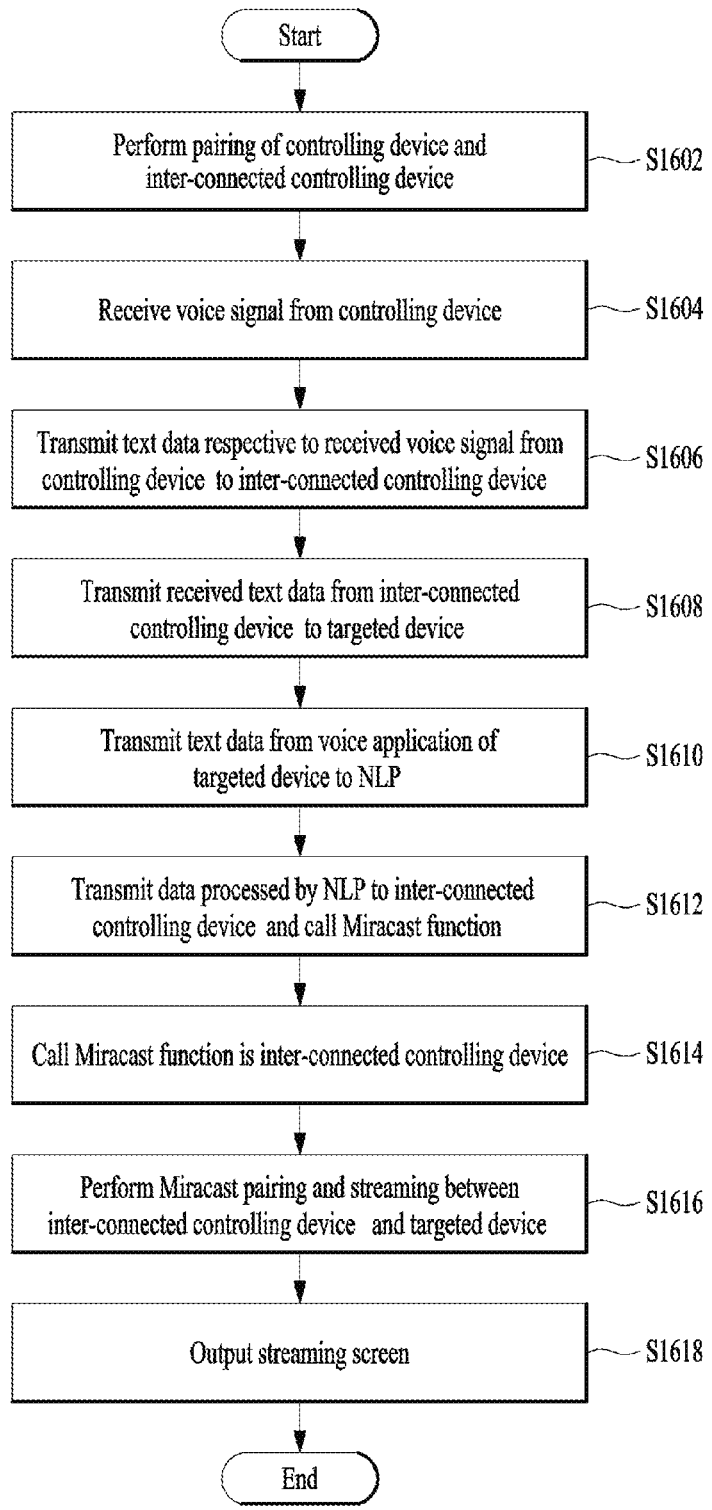
FIG. 16 illustrates a flow chart for describing a procedure for performing a Miracast function with a targeted device through a controlling device in the device controlling system of FIG. 15.

FIG. 15 illustrates a drawing for describing internal configuration modules of device controlling system components based upon FIG. 14, and FIG. 16 illustrates a flow chart for describing a procedure for performing a Miracast function with a targeted device through a controlling device in the device controlling system of FIG. 15.

Referring to FIG. 15, the device controlling system is configured of a controlling device (1510), an inter-connected controlling device (1520), and a targeted device (1530).

The controlling device (1510) may execute diverse applications including OS, such as Android Wear, and so on, services, functions, and so on. At this point, the controlling device (1510) may be equipped with a control application for controlling the targeted device.

The inter-connected controlling device (1520) may execute diverse applications including OS, such as Android Wear, and so on, services, functions, and so on, which are identical to or different from those of the controlling device (1510), and, being paired with the controlling device (1510), the inter-connected controlling device (1520) receives text data and delivers the received text data to its paired targeted device (1530). Additionally, the inter-connected controlling device (1520) is equipped with a target device control application as a companion application, which performs the same or similar functions as those of the controlling device (1510). The target device control application may include a Bluetooth manager and a Miracast function block.

The targeted device (1530) is paired with the controlling device (1510) or the inter-connected controlling device (1520) based upon a web OS platform, and the targeted device (1530) performs a function respective to the voice signal being inputted to the controlling device (1520). The targeted device (1530) may include a Bluetooth manager, a voice application, an NLP, a Miracast function block, and so on, in order to perform the above-described functions. Meanwhile, the targeted device (1530) may be capable of supporting specific OS platforms from the controlling device (1510) or/and the inter-connected controlling device (1520) based upon the web OS platform or may be capable of processing the respective data.

Hereinafter, a procedure for processing, for example, execution of Miracast functions in the device controlling system of FIG. 15 will be described in detail with reference to the flow chart of FIG. 16.

First of all, the controlling device (1510) and the inter-connected controlling device (1520) are paired (S1602).

The controlling device (1510) receives a voice signal (S1604), and, then, after converting the voice signal to digital voice data, the controlling device (1510) generates text data based upon the converted digital voice data. The controlling device (1510) delivers the generated text data to the inter-connected controlling device (1520) (S1606).

The inter-connected controlling device (1520) transmits the text data, which are received in step S1606, to the targeted device (1530) through the Bluetooth manager (S1608).

The targeted device (1530) delivers the text data, which are received by its Bluetooth manager from the Bluetooth manager of the inter-connected controlling device, to a voice application, and the voice application transmits the text data back to the NLP, which processes the text data (S1610).

The data processed in the NLP are transmitted back to the inter-connected controlling device (1520) through the Bluetooth manager, and, herein, if the data processed in the NLP correspond to a control command respective to Miracast, the targeted device (1530) calls a Miracast function (S1612).

The inter-connected controlling device calls a Miracast function based upon the text data, which are received by its Bluetooth manager from the Bluetooth manager of the targeted device (1530) (S1614).

Thereafter, the inter-connected controlling device (1520) and the targeted device (1530) initiate Miracast pairing and streaming between one another (S1616).

The targeted device (1530) outputs the data received via streaming after step S1616 on its display screen (S1618).

Figure 17:
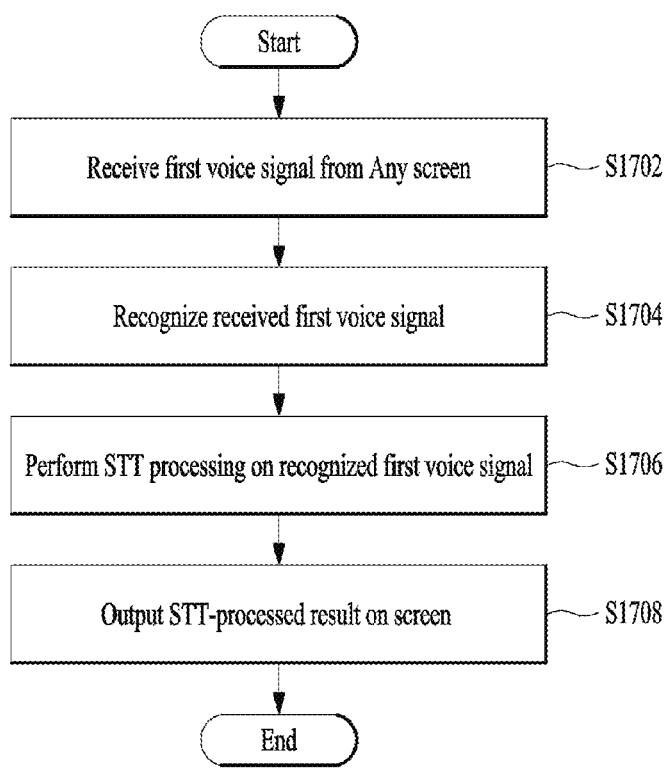
FIG. 17 illustrates a flow chart for describing a control command processing procedure of a targeted device according to an exemplary embodiment of the present invention.

FIG. 17 illustrates a flow chart for describing a control command processing procedure of a targeted device according to an exemplary embodiment of the present invention, and FIGS. 18 to 23 illustrate drawings for describing operations of the targeted device according to FIG. 17.

The targeted device receives a voice signal corresponding to a control command through the controlling device in an Any screen state (S1702), and, then, the targeted device may perform the respective operations. For example, the targeted device may be shifted, from the any screen state, to a mode (FIG. 20) for receiving a voice signal through the controlling device (also including the inter-connected controlling device). Meanwhile, even if the targeted device is not shifted to the voice signal receiving mode, the targeted device may receive a voice signal of the controlling device and may process the received voice signal. However, in case of the user, it is preferable to allow the user to be capable of intuitively identifying whether or not the control command made through his (or her) voice is being properly delivered to the targeted device, or whether or not an incorrect control command is being transmitted, or whether or not an unintended control command is being transmitted, and so on, and, then, to be capable of performing respective additional processing. Accordingly, at least one of the targeted device and the controlling device is required to be provided to be capable of identifying whether or not a control command through the user's voice signal is functioning properly. Meanwhile, although the user may deliver a voice signal as the control command starting from the beginning, as a preparation procedure for performing the respective operations, the targeted device may perform an operation announcing the shift to the voice signal receiving mode. By performing such operation, all shifts of the targeted device may be deduced through a simple emission of the user's voice signal, an input of a predetermined button of the controlling device, a gesture, and so on. Thereafter, if a mode shift of the targeted device is recognized, the user may emit a voice signal respective to the actual control command to the controlling device.

Figure 20:
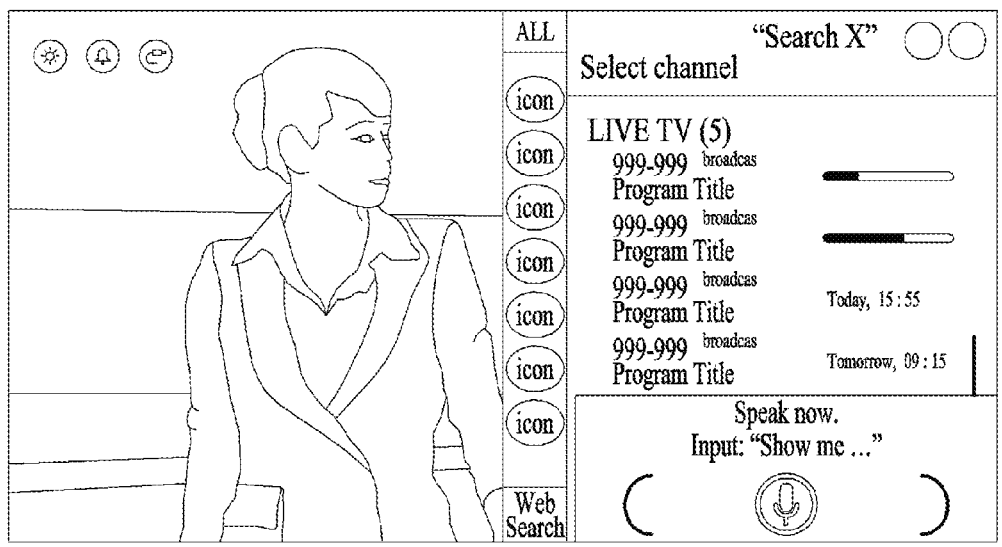

As shown in FIG. 20, if the targeted device undergoes a mode shift, the targeted device recognizes a voice signal of the user, which is received through the controlling device (S1704).

The targeted device performs STT processing on the received voice signal of the user (S1706). In the description provided above, although it is described that STT processing is generally realized in any one of the controlling device, the inter-connected controlling device, and the server, the present invention will not be necessarily limited only to this. More specifically, as shown in FIG. 17, the targeted device may receive the voice signal of the user, as it is, without modification through the controlling device and may, then, directly perform at least one of the procedure of conversion to digital voice data and the STT conversion procedure. The STT processed voice signal, which is processed as described above, may be recognized as a specific control command through the NLP processing.

The targeted device may output a result respective to the STT processed voice signal on its display screen (S1708).

Hereinafter, FIG. 17 will be described in more detail with reference to FIGS. 18 to 23. At this point, as shown in the drawing, the screen configuration of the targeted device according to FIG. 17 may be provided as a divided screen or in an overlaying format overlaid on a predetermined portion of the main screen.

Figure 18:
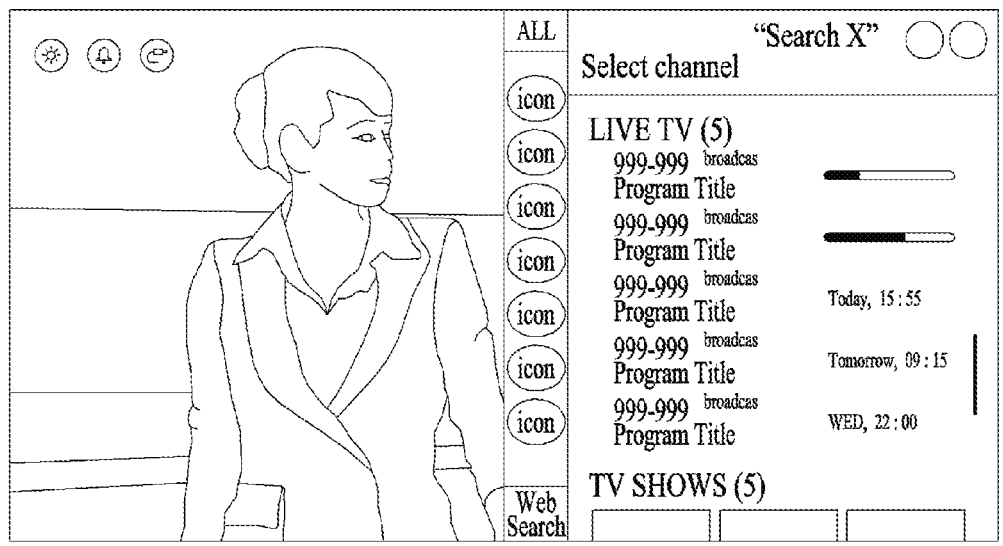
FIGS. 18 to 23 illustrate drawings for describing operations of the targeted device according to FIG. 17.

FIG. 18 illustrates a screen configuration providing a result respective to the STT processes voice signal according to step S1708. Referring to the screen configuration of FIG. 18, icons, which are mapped to a search result of a search function request respective to the STT processed voice signal, such as "Search X", are outputted to one side of the screen, and detailed search results respective to each of the icons are provided near the outputted icons. For example, if the content of FIG. 18 relates to a channel search, as shown in the drawing, an associated channel list is provided.

Figure 19:
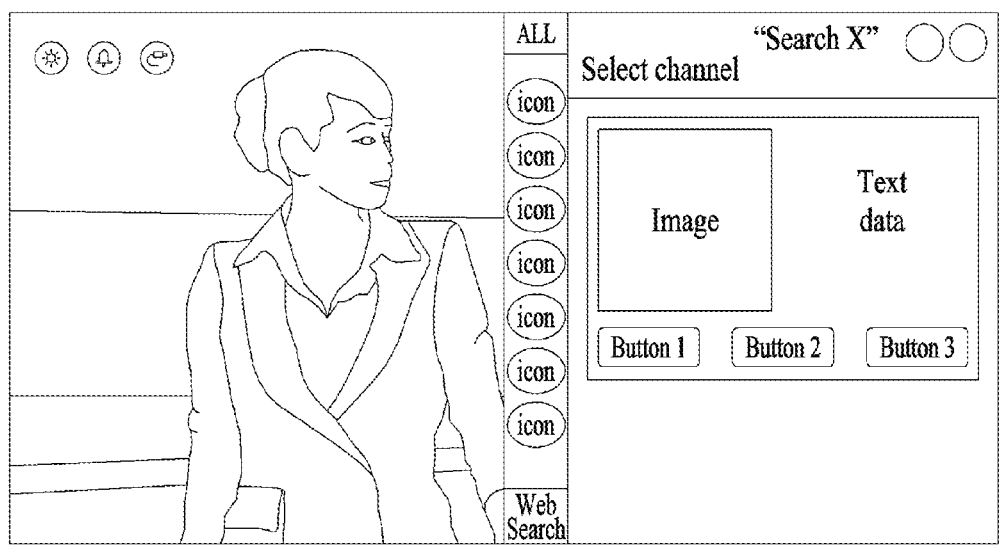

In FIG. 19, in case a predetermined channel is selected in FIG. 18, although the search icons are maintained as they are, the detailed search result screen disappears, and the screen is shifted to a screen corresponding to the selected channel. The shifted screen, which is shifted as described above, may be configured by including moving picture or thumbnail image data, text data respective to synopsis, character information, and so on, and one or more function buttons for conveniently executing functions of reserved scheduling for other viewing, scheduled (or reserved) recording, immediate recording, time machine function, and so on.

Figure 21:
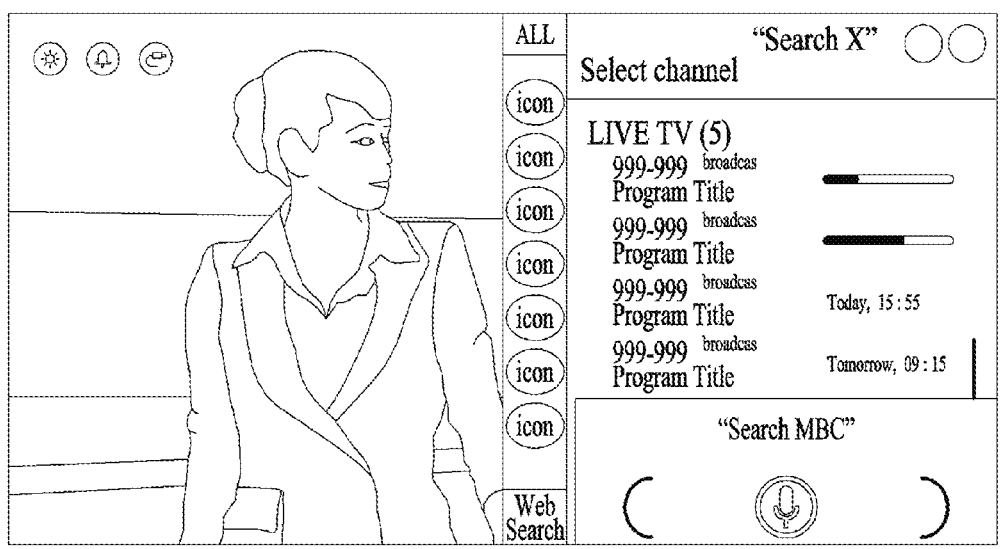
Figure 22:
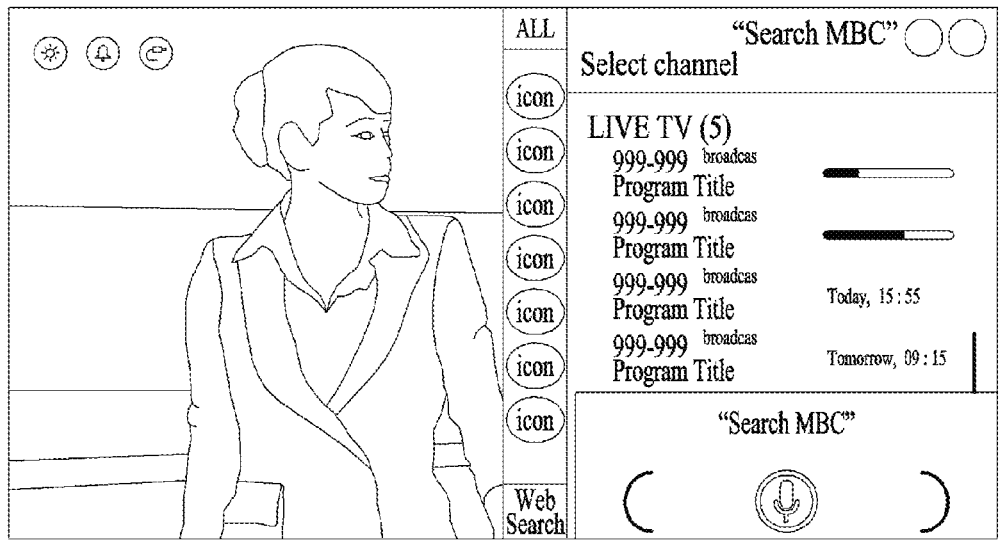

FIG. 20 corresponds to a screen, which is shifted to a mode for receiving the voice signal of the user respective to the control command, in case the user intends to perform another function in succession to the above-described FIG. 19, and FIG. 21 corresponds to a screen after the mode shift, wherein the voice signal of the user is received and recognized, and wherein text data respective to the control command are outputted through STT and NLP processing, and, in case the outputted text data correspond to the voice signal intended by the user, FIG. 22 corresponds to a screen configuration, which allows the user to identify that a function respective is being executed in accordance with the user's selection or automatically.

Figure 23:
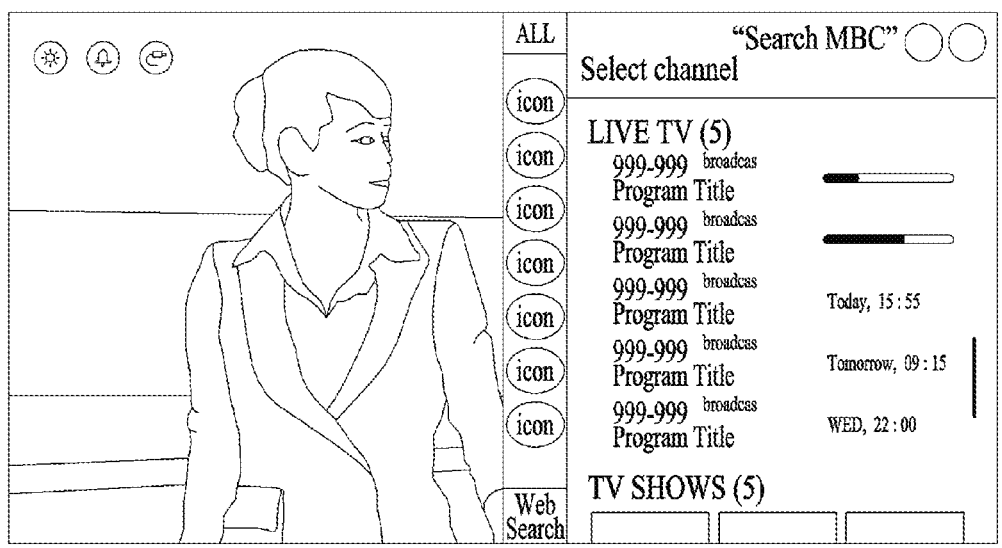

FIG. 22 corresponds to a screen indicating that the result is currently being searched, and FIG. 23 corresponds to a screen providing the search result, such as the search result shown in FIG. 18, in accordance with the search result of FIG. 22.

Figure 24:
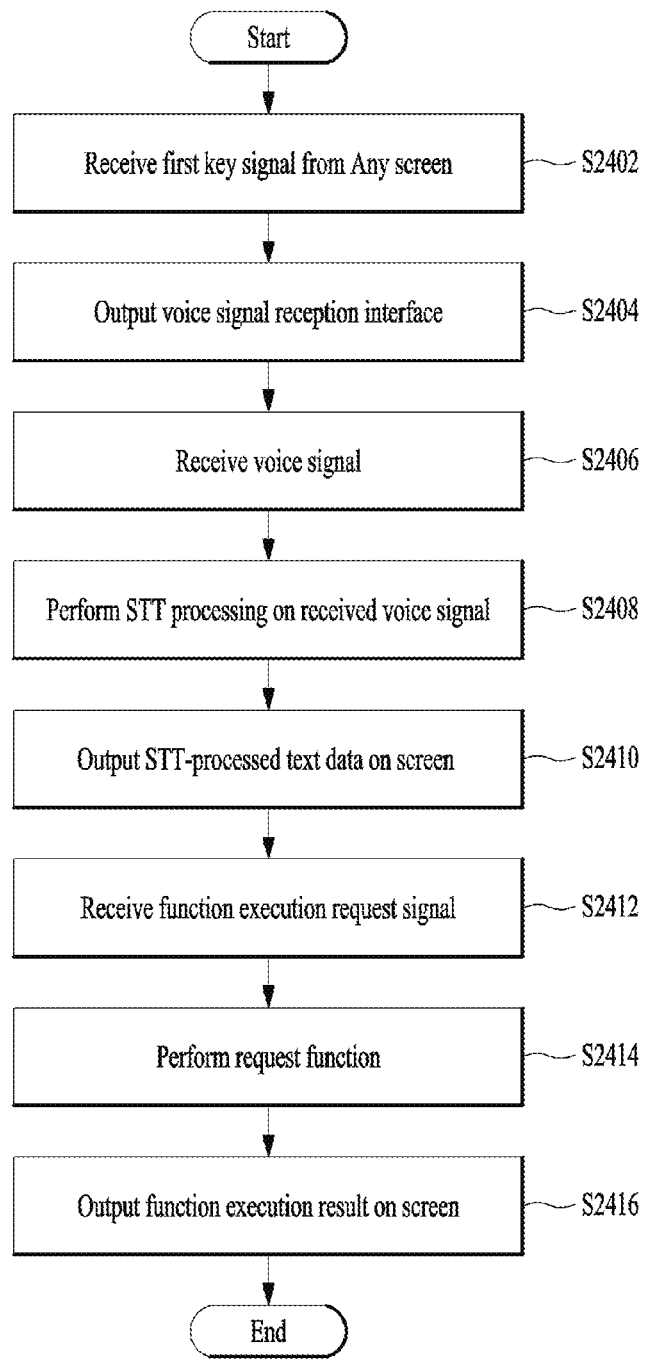
FIG. 24 illustrates a flow chart for describing a control command processing procedure of a targeted device according to another exemplary embodiment of the present invention.

FIG. 24 illustrates a flow chart for describing a control command processing procedure of a targeted device according to another exemplary embodiment of the present invention, and FIGS. 25 to 28 illustrate drawings for describing operations of the targeted device according to FIG. 24.

The control command processing procedure performed by the targeted device will hereinafter be described, as follows, with reference to FIG. 24.

When the targeted device receives a first signal from the controlling device or the inter-connected controlling device while in the Any screen state (S2402), the targeted device outputs a voice signal receiving interface respective to the received first signal (S2404). Herein, instead of being used for actually receiving the voice signal through the targeted device, the outputted voice signal receiving interface is used for allowing the fact that a control command including the voice signal is being received by the targeted device through the controlling device to be identified by the user.

The targeted device receives the voice signal from the controlling device (S2406), and, then, the targeted device performs STT processing on the received voice signal (S2408). At this point, the targeted device performs NLP processing after performing the STT processing.

The targeted device outputs the STT/NLP processed text data on its display screen (S2410).

In case the outputted text data match with the intention of the control command, which is transmitted by the user through the controlling device, the targeted device requested for a loading of a function block for executing the function matching with the control command (S2412).

Thereafter, the targeted device performs the function, which is requested by the user, through the loaded function block (S2414), and, then, the targeted device output a screen, result, and so on, associated with the execution of the function (S2416).

FIG. 25, for example, illustrates a drawing for describing a voice signal transmitted by the user through the controlling device and screen operations respective to the voice signal.

When the user transmits a spoken words saying "Show me NAVER" as a voice signal through the controlling device, the targeted device receives the voice signal through the controlling device and then performs STT processing on the received voice signal and then generates text data. The targeted device performs NLP processing on the text data generated as described above and finally determines the intention of "Provide NAVER website through web browser" respective to the voice signal and, then, provides a result associated with the determined intention. At this point, instead of being generated as a single optimized result, the NLP processing result may be generated as multiple associated result screen, and, herein, in addition to a case when a single optimized result screen exists, even in the case when multiple result screens exist, the result screen may be outputted to the display screen so that the intentions of the user can be finally verified. Meanwhile, as described above, in order to verify and select the user's intentions, instead of providing the result screens each time, the targeted device may also directly execute the optimized result. Additionally, as described above, in case the result screen is provided on the display screen, even though the user does not select the corresponding result screen, after an elapse of a predetermined period of time, the corresponding result may or may not be executed. Additionally, as described above, in case multiple result screen are being provided, the result screens are aligned in accordance with priority levels respective to the matching rate of the corresponding result with the user's intentions, and in case the user does not select any result within a predetermined period of time, the result having the highest priority level may be automatically executed. Meanwhile, the selection of the result screen is not necessarily required to be performed through the same voice signal, which is previously used in an earlier process, and, therefore, the selection may be realized by using diverse methods, such as key button selection, gesture input, and so on. Meanwhile, as described above, in addition to the case of having the priority levels or the result screen configurations configured based upon the inputted voice signal, the result screen configuration and the priority levels of the result screens may be decided and provided based upon diverse history data, such as the selection of the user respective to the previously used voice signal, the targeted device usage pattern of the user, and the attributes of the content that is currently being viewed.

Thereafter, in case the user transmits a voice signal indicating "Search OO in NAVER" through the controlling device, the targeted device executes a web browser and moves to the corresponding web site and, then, executes search in the web site based upon the search word and, then, provides the respective search result. Meanwhile, in case no search result searched based upon the corresponding search word exists, reference may be made to another search site (or search engine) or an automatic search function may be executed by using a search word, which is provided from the corresponding web site, as an associated search word that is associated with the initially used search word. The above-described series of procedures is provided through the display screen of the targeted device. Meanwhile, during the above-described process, in case a content currently being viewed exists, the targeted device may provide the function execution procedure and the respective result by performing screen division from the corresponding content or through a web browser or window that overlays with the corresponding content.

Finally, in case the user transmits a voice signal respective to "Search OO web", "Inform me of (Tell me) OO" through the controlling device, the targeted device executes the search through a main web of each country (a Default web site of the web browser) and then provides the search result.

Meanwhile, although it is not shown in the drawing, in case the user transmits a voice signal including multiple control commands through a single controlling device within a predetermined period of time, a problem may occur in the processing of the corresponding voice signal. In this case, identification on whether or not the voice signal generated after the initial voice signal corresponds to control command should be carried out beforehand. Based upon the identified result, if the subsequent voice signal also includes a control command, the following processing may be carried out. If a control command (second control command) included in the subsequent voice signal is in conflict with the previous control command (first control command), the second control command may be disregarded (or ignored), or only the second control command may be validly processed instead of the first control command. However, in case the second control command is not in conflict with the first control command, in case there is sufficient resource for executing the second control command, the second control command is executed in parallel with the first control command. However, even though the second control command is not in conflict with the first control command, if the resource for carrying out the control commands is insufficient (including a case when carrying out the control commands is not possible due to resource sharing), a notice indicating that the execution of the second control command is currently not possible may be displayed on the display screen along with another notice indicating that the execution of the corresponding command is in stand-by for execution as soon as the required resource is procured. At this point, if resource procurement is available by interrupting another operation, the respective detail may be outputted on the display screen so as to request the user to make a selection (or choice).

Moreover, although it is not shown in the drawing, if voice signals including multiple control commands are transmitted through multiple controlling devices within a predetermined period of time, a problem may occur in the processing of the corresponding voice signals. First of all, the control commands that are being received after the initial control command are identified, and, then, the control commands that overlap with the initial control command are disregarded (or ignored). However, based upon the identification result, if one or more control commands that do not overlap with the initial control command exist, a comparison process is carried out on the attributes of the corresponding control commands, and, then, it is determined whether or not the corresponding control commands are in conflict with the initial control command Based upon the determined result, if present, one or more conflicting control commands are disregarded, or operations respective to the conflicting control commands are performed. Conversely, in case non-conflicting control commands exist, a comparison process is carried out on the availability of resources, and so on, and, then, it is also determined whether or not concurrent operation (or parallel operation) can be carried out. If it is determined that concurrent operation can be carried out, operations respective to the corresponding control commands are carried out concurrently, otherwise, however, a stand-by notice may be indicated, so that the process can wait until the user makes his (or her) choice.

Meanwhile, when voice signals including the same control command are received through multiple controlling devices, all of the control commands received after the initial control command are disregarded. Meanwhile, when the above-described procedure is repeated for a pre-decided number of times, a control command directing interruption of the voice signal transmission to the corresponding devices may be transmitted to the corresponding control devices from the targeted device.

Referring to FIG. 26, when a voice signal is received through the controlling device while a content is being outputted through the main screen, as shown in the drawing, a voice interface is outputted so as to allow the reception of the control command of the user to be identified. Additionally, by displaying the results of performing STT/NLP processing on the received voice signal to text data along with the voice interface, the user may be capable of verifying whether or not his (or her) control command has been properly delivered.

Figure 27:
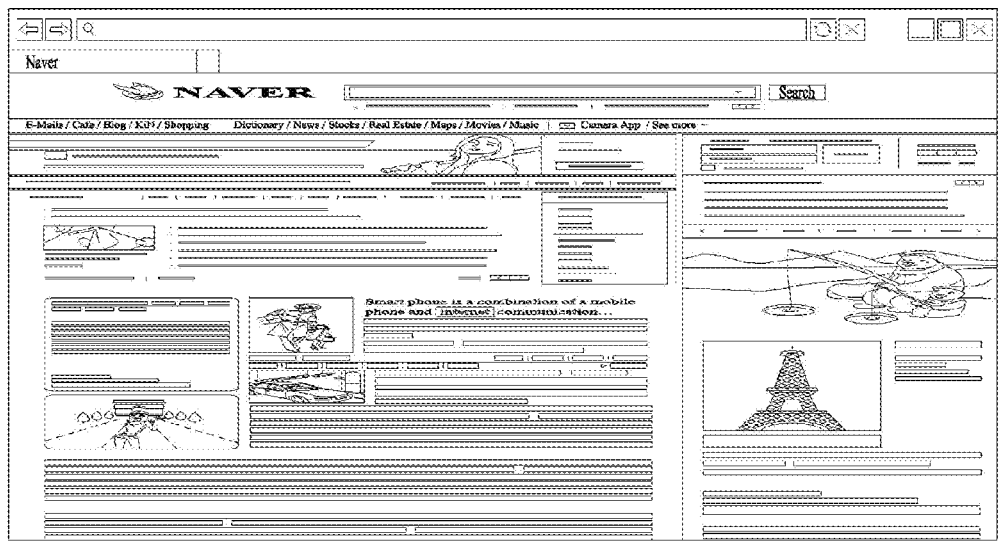
Figure 28:
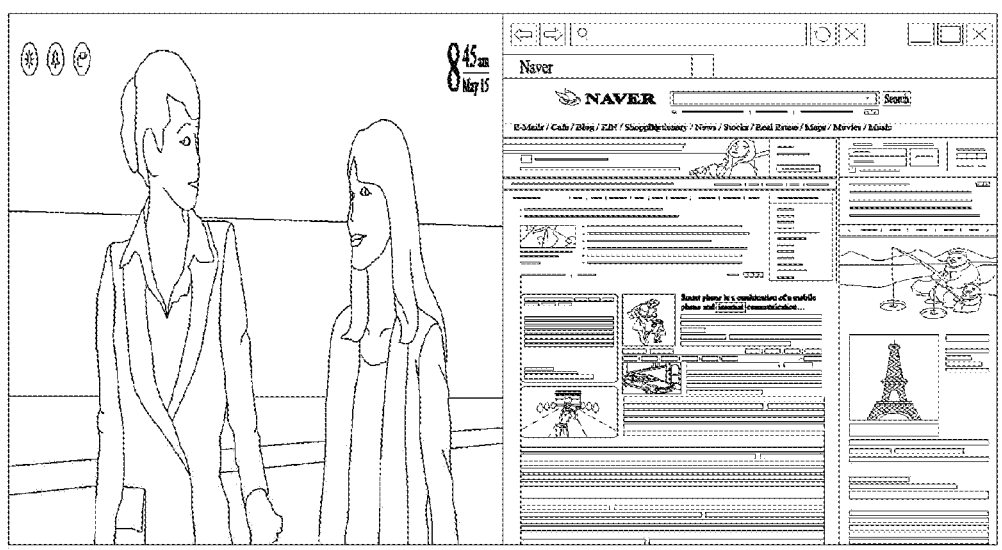

FIG. 27 and FIG. 28 correspond to drawings providing result screens after FIG. 26. Herein, FIG. 27 corresponds to a case when the result screen is being provided through the entire display screen, and, in FIG. 28, the result screen corresponds to a screen configuration being divided (or separated) from the content or to a screen configuration being outputted by overlaying a predetermined section of the screen. In case of FIG. 27, the content that was already being outputted through the main screen is automatically shifted to the background and its execution is interrupted. If the content that is shifted to the background corresponds to a live broadcast, a recording function is automatically executed in accordance with the time machine function.

FIGS. 29 to 32 illustrate drawings for describing operations of the targeted device after FIGS. 26 to 28.

As described above, FIG. 29 illustrates a screen, wherein a web browser is executed in accordance with the user's web browser execution control command through the controlling device.

Herein, when the user points to a search window (2910) within the webpage by moving a pointer (2915), the targeted device may provide a virtual keyboard (2920) for inputting a search word that is required for executing the search function.

Figure 29:
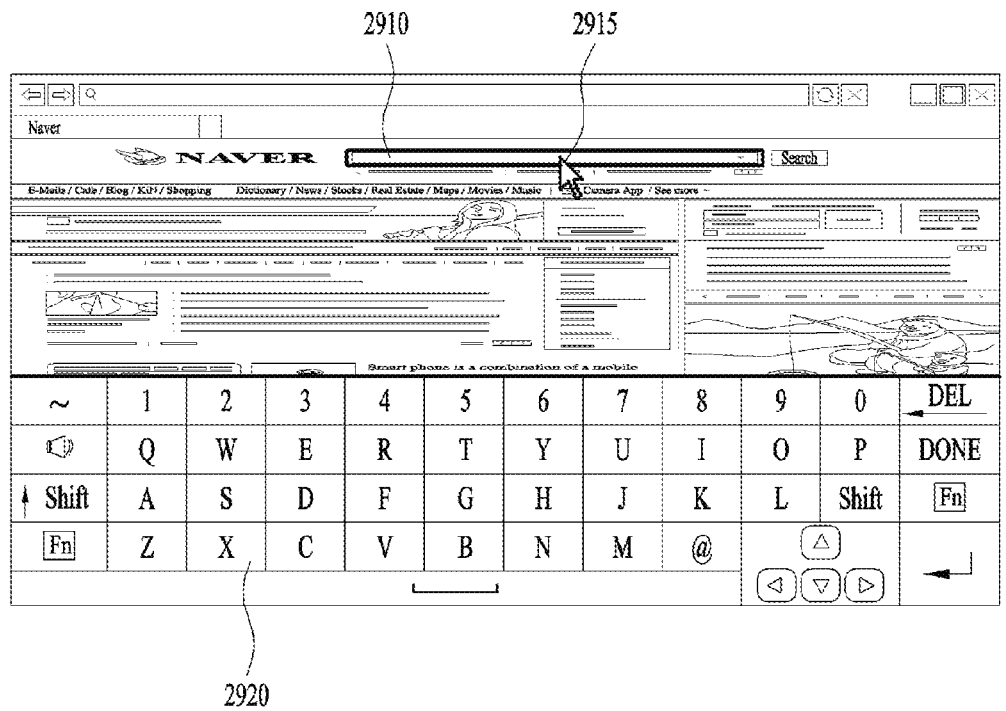
FIGS. 29 to 32 illustrate drawings for describing operations of the targeted device after FIGS. 26 to 28.

Although FIG. 29, which is described above, corresponds to a general process of using the search function in the targeted device, a problem lies herein in that this is not frequently used due to the inconvenience of having to move the pointer several times in order to input the search word. Therefore, according to the present invention, a search word may be completed by simply transmitting a voice signal including the search word through the controlling device, and, then, the search function may be used based upon the received voice signal including the search word.

In case of following the present invention, the input of the search word through the voice signal may be realized by simply transmitting a voice signal through the controlling device in a situation where the corresponding webpage is outputted without having to use the pointer of the web browser, or requesting for a voice interface of the remote controller, or performing any other operations.

Figure 30:
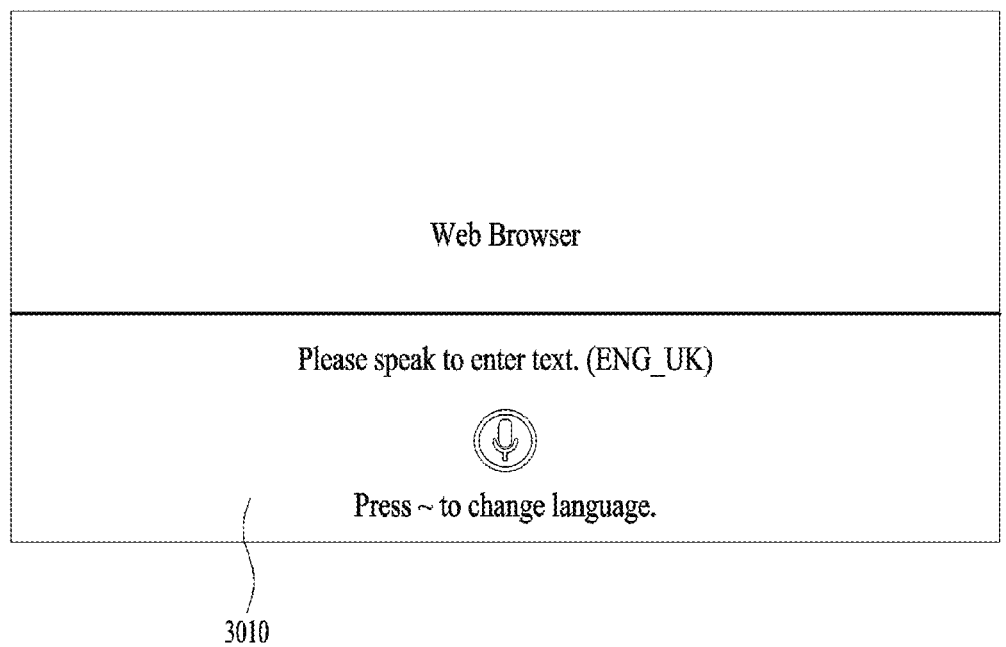

For example, as shown in FIG. 29, in case a webpage is outputted on the web browser, if the user transmits a voice signal including the search word through the controlling device by using the same method, which was previously used, the targeted device parses the voice signal and converts the parsed voice signal to text data. At this point, when the voice signal is received, as shown in FIG. 30, the targeted device outputs a voice interface (3010), so as to indicate that the user's voice signal including the search word has been received and is being processed.

Figure 31:
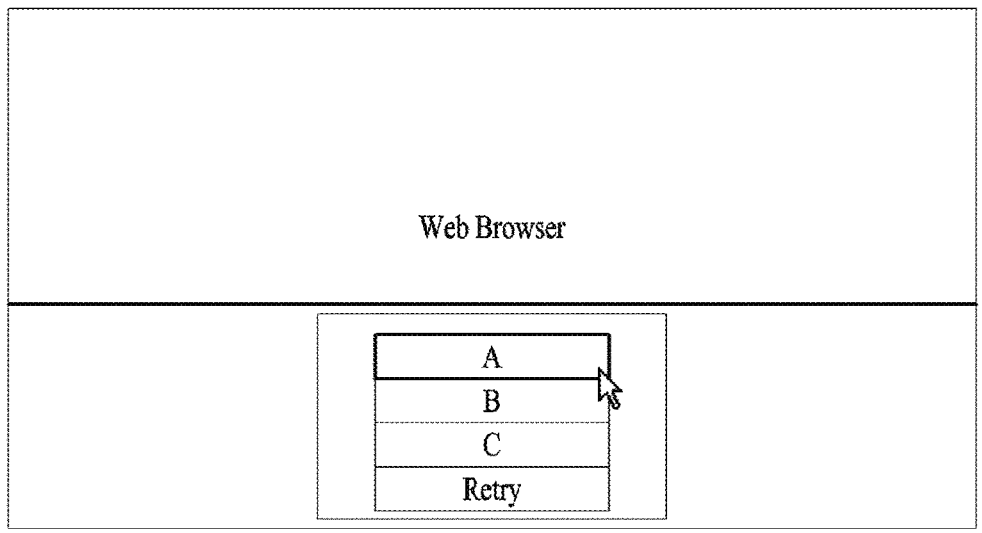
Figure 32:
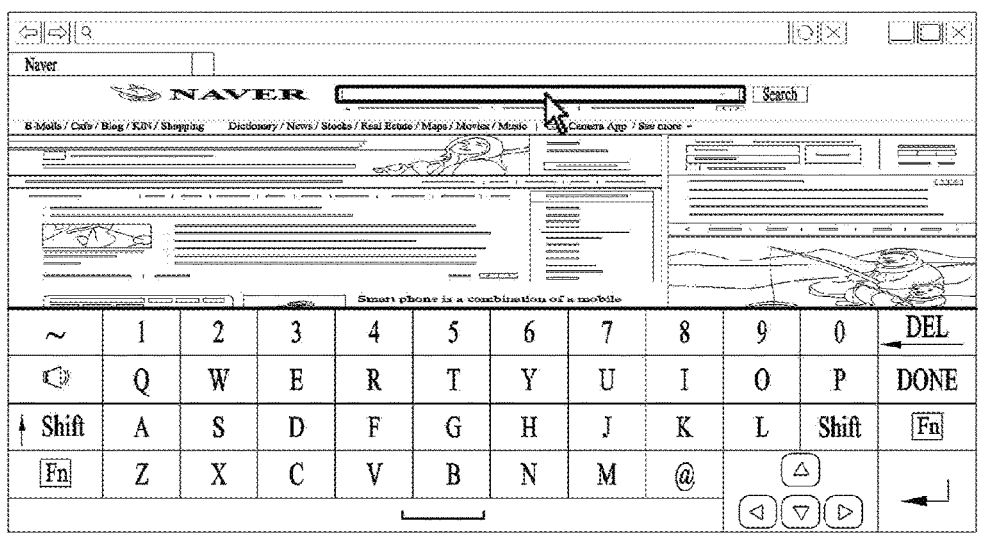

Thereafter, the targeted device outputs the processed text data, as shown in FIG. 31, and, then, when a user's choice is made, as shown in FIG. 32, the targeted device allows the selected search word to be outputted to the search window of the webpage. Subsequently, by having the user transmit a start search control command back to a voice signal or select control command through the pointer, a search on the corresponding search word may be initiated (or started) and the respective search result may be outputted. As described above in FIG. 31, in case there are multiple sets of the processed text data, all sets of the processed text data may be outputted so as to allow the user to perform selection.

Figure 33:
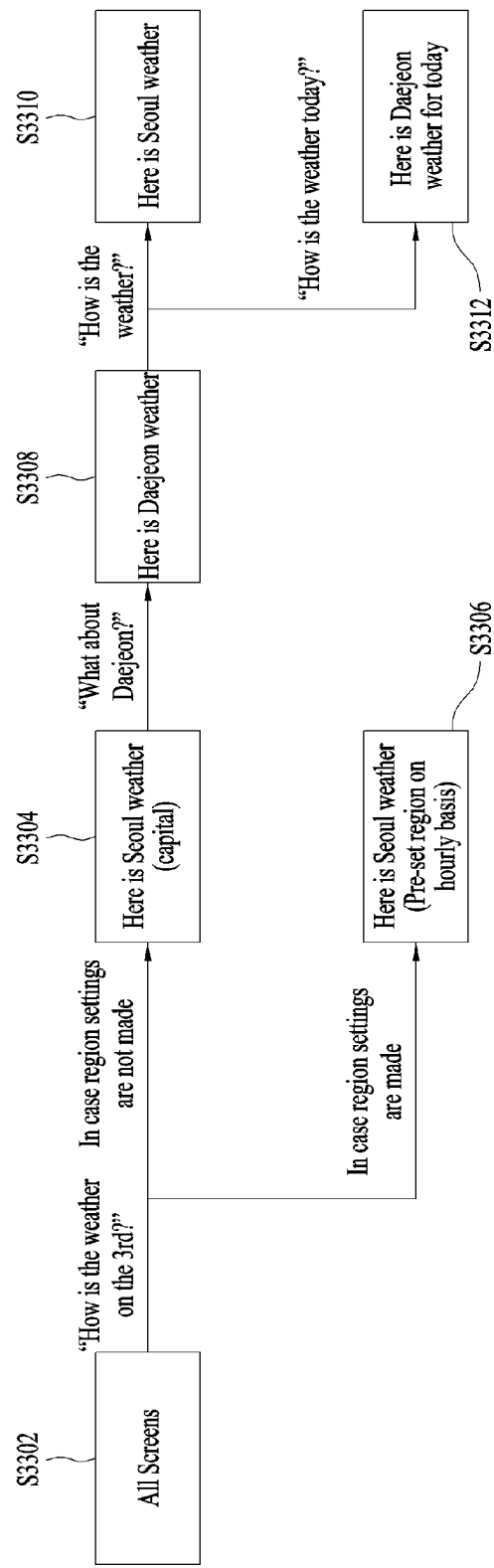
FIGS. 33 and 34 illustrate drawings for describing a procedure for processing weather information through the controlling device according to the present invention.
Figure 34:
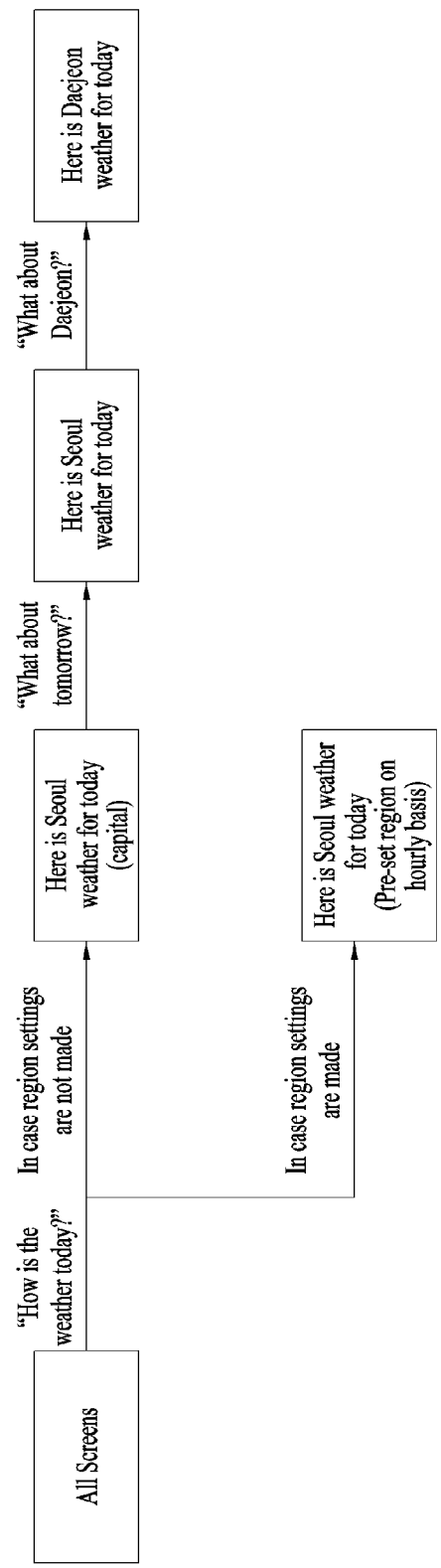
Figure 35:
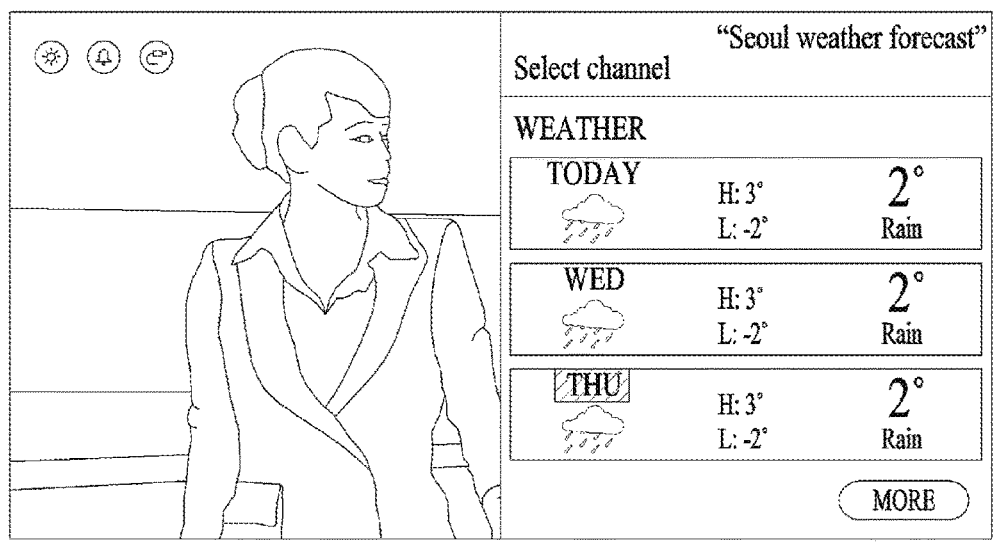
FIG. 35 illustrates a drawing for describing a result screen configuration of the targeted screen related to FIG. 33 or 34.

FIGS. 33 and 34 illustrate drawings for describing a procedure for processing weather information through the controlling device according to the present invention, and FIG. 35 illustrates a drawing for describing a result screen configuration of the targeted screen related to FIG. 33 or FIG. 34.

FIG. 33 to FIG. 35 illustrate a procedure for processing weather information within the targeted device through the controlling device, and the respective screen configuration may be diversely realized within the targeted device in accordance with region, date, and so on.

Referring to FIG. 33, in an Any screen state of the targeted device, when the user inputs a voice signal including a control command of "How is the weather on the $3^{rd}$?" through the controlling device (S3302), the targeted device processes and outputs the text data respective to the voice signal, which is inputted through the voice interface, and, then, the targeted device outputs the respective result screen.

At this point, in case region settings are not made in the targeted device, weather data respective to the region in which the user is currently located are provided firsthand as the result screen (S3304). However, in case region settings are made in the targeted device, weather data respective to the region corresponding to the region setting are provided as the result screen (S3306).

Thereafter, in step S3304 or S3306, if the user inputs a voice signal including a control command of "What about Daejeon?", the targeted device provides weather information of the corresponding region (S3308).

The weather forecast being provided in steps S3304, S3306, and S3308 may, for example, provide weather information for 3 days including the corresponding date.

In step S3302 or step S3308, in case the user inputs a control command of "How is the weather?", weather information respective to the current location is provided once again, as described above in step S3304 (S3310). More specifically, as shown in the drawing, even if the control command is inputted after step S3308, weather information of the current location, i.e., Seoul, is provided instead of the weather information of Daejeon. However, unlike in step S3310, in case a control command of "How is the weather today?" is transmitted in the above-described process, Today's weather information of Daejeon is provided (S3312).

Meanwhile, the weather information may be provided in time units and, for example, in units of any one of the predetermined region (or province), si (city), gun (county), gu (district), dong (neighborhood), and so on. Herein, the time unit may correspond to days or hours within the range of one whole day.

FIG. 34 is almost the same as the details that are described above, and, herein, in case inputting an initial control command of "How is the weather today?", Today's weather information respective to any one of the region predetermined in accordance the region settings and the current location is provided. Meanwhile, in case a subsequent control command of "What about tomorrow?" is inputted afterwards, Tomorrow's weather information of the corresponding region is provided. Thereafter, if a subsequent control command of "What about Daejeon?" is inputted, Tomorrow's weather information of Daejeon is provided.

As described above, accurate information on the region and time, and so on, respective to the search word may be provided.

In case the user inputs a control command of "What's the weather forecast in Seoul?", FIG. 35 corresponds to a screen configuration providing weather information on the Seoul region for Today, Tomorrow, and the Day After Tomorrow in the targeted device with respect to the inputted control command. In case the user wishes to view the weather information for additional dates, by accessing the "MORE" button, weather information for additional dates may also be provided.

FIG. 36 illustrates a drawing for describing interactive data processing procedure of the targeted device according to an exemplary embodiment of the present invention.

For example, FIG. 36 illustrates a screen configuration providing interactive services in the targeted device with respect to inputted control commands of the controlling device according to the present invention.

For example, referring to FIG. 36a, when the targeted device receives a voice signal from the controlling device while content is being outputted, the targeted device outputs a voice interface on a predetermined portion of its display screen. The targeted device performs STT/NLP processing on the received voice signal and, then, converts the STT/NLP processed voice signal to text data and, then, provides the converted text data.

In case the information (or content) of the user's control command, which is converted to text data, correspond to information (or content) that are not related, for example, to the execution of a specific function, the execution of an application, and so on, in the targeted device, and, more specifically, in case the control command corresponds to text data related to general information (or content) other than the execution of functions of the targeted device, the execution of the functions of the targeted device, the targeted device may provide interactive services respective to the reception of the voice signal. Herein, an interactive service may collectively refer to all services respective to voice signals recommending contents to the user generally based upon diverse information, the emotional state of the user, weather information of the surrounding area, time information, and so on.

For example, as shown in FIG. 36a, if the user inputs a voice signal, such as "I am bored.", the targeted device converts the inputted voice signal to text data and, then, provides the converted text data. And, then, the targeted device analyzes the significance or intention of the provided converted text data and may, then, provide response data, as shown in FIG. 36b. In FIG. 36b, "Do you want to watch something?" has been provided as the response data. However, instead of limiting the response data only to the above-described text data, diverse forms of data, such as web browser, moving picture images, still images, audio, and so on, may be provided. For example, in accordance with FIG. 36a, a most recently released song of the user's favorite singer may be played, or the Joke of the Day or the Latest Breaking News may be provided by executing a web browser in FIG. 36b. Alternatively, by searching free VODs, a response may be made, which enables the user to view his (or her) favorite movie or TV series genre.

Meanwhile, such interactive services may also be applied in the above-described procedures.

MODE FOR CARRYING OUT THE PRESENT INVENTION

According to the present invention, even if it does not merely correspond to executing a remote controller replacing application of the controlling device, wherein the application merely replaces the related art remote controller, in addition to being capable of simply controlling the targeted device by using the basic functions of the controlling device, easily targeting the targeted device from a remote location, even if it is not targeted by a remote controller that is mapped to each targeted device belonging to a network, and then controlling the targeted device, and controlling the targeted device by using a touch method after executing a specific application that is required for controlling the targeted device in the controlling device, the controlling device may control the targeted device through an input signal, such as a voice or a gesture, and, the targeted device may be easily configured (or set up) and controlling by using the closest (or most closely located) controlling device, among the diverse controlling devices belonging to the network.

Instead of having the configurations and methods of the above-described exemplary embodiments of the present invention applied with limitations, the digital device and the method for controlling the digital device according to the present invention may be realized by combining all of the exemplary embodiments or selectively combining some of the exemplary embodiments, so that the exemplary embodiments of the present invention can be diversely modified.

Meanwhile, the method for operating a digital device according to the present invention may be realized as a code that can be read by a processor, which is provided in a digital device, in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

INDUSTRIAL APPLICABILITY

The present invention relates to a device controlling system and a digital device, and, therefore, the present invention may be used throughout the entire industry using digital devices.

What is claimed is:

1. A targeted device being controlled by a control command received through at least one or more controlling devices, the targeted device comprises:
   a first receiving unit receiving content for a Miracast service from a mobile terminal;
   a second receiving unit receiving a voice signal or text data respective to the voice signal for a voice recognition service from a wearable device wherein the voice signal or the text data is transmitted from the wearable device to the targeted device via a mobile terminal;
   a decoder decoding the content;
   a processing unit processing the text data;
   a controlling unit:
      identifying whether text data received from the processed text data includes a control command, controlling an output of a voice interface in response to a reception of the received text data,
configuring a result screen respective to the processed text data and controlling an output of the result screen, and
performing control operations so as to execute functions corresponding to the outputted result screen; and
an outputting unit outputting the decoded content, the voice interface and the result screen or a function execution screen.

2. The targeted device of claim 1, wherein the targeted device includes a Bluetooth manager so as to be connected to the at least one or more controlling devices through a Bluetooth communication protocol.

3. The targeted device of claim 2, wherein the processing unit performs STT (Speech to Text) and NLP (Natural Language Processing) processing when a voice signal is received from the controlling device, and wherein the processing unit performs only NLP processing when text data respective to the voice signal is received.

4. The targeted device of claim 1, wherein the controlling unit determines whether or not a control command of a voice signal or text data is included based upon identification information included in the voice signal or the text data respective to the voice signal received from the controlling device.

5. The targeted device of claim 1, wherein, when the outputting unit is outputting content, the controlling unit performs control operations so as to output the result screen and the function execution screen by dividing a screen and outputting the result screen and the function execution screen on any one of the divided screens or by overlaying the result screen and the function execution screen on a predetermined portion of the screen on which the content is being outputted.

6. The targeted device of claim 1, wherein, when the processed data is related to an execution of a specific function, the controlling unit determines whether or not a resource related to at least one or more function blocks is available for usage, the resource being required for performing the corresponding function, and, based upon the determined result, if the resource is available for usage, the controlling unit calls the corresponding function block.

7. The targeted device of claim 1, wherein, when the processed data correspond to a text message that is not related to an execution of a function, the controlling unit allocates a resource for providing an interactive service, collects user history data associated with the text message, and provides an interactive service including content recommendation.

8. The targeted device of claim 1, wherein the targeted device corresponds to a digital TV, and wherein the at least one or more controlling devices include at least one of wearable devices and mobile terminals.

9. A method for controlling a targeted device by a control command received through at least one or more controlling devices, the method comprising:
receiving content for a Miracast service from a mobile terminal;
decoding the content and outputting the decoded content to a screen;
receiving a voice signal or text data respective to the voice signal for a voice recognition service from a wearable device wherein the voice signal or the text data is transmitted from the wearable device to the targeted device via a mobile terminal;
processing the received voice signal or text data;
identifying whether a control command is included in the processed data and outputting a voice interface;
configuring and outputting a result screen respective to the control command included in the processed data;
executing functions corresponding to the outputted result screen; and
outputting a function execution screen.

10. The method of claim 9, wherein connection is established with the at least one or more controlling devices through a Bluetooth communication protocol.

11. The method of claim 10, wherein STT (Speech to Text) and NLP (Natural Language Processing) processing is performed when a voice signal is received from the controlling device, and wherein only NLP processing is performed when text data respective to the voice signal is received.

12. The method of claim 9, wherein whether or not a control command of a voice signal or text data is included is determined based upon identification information included in the voice signal or the text data respective to the voice signal received from the controlling device.

13. The method of claim 9, wherein the result screen and the function execution screen are outputted by dividing a screen on which the content is being outputted and outputting the result screen and the function execution screen on any one of the divided screens or by overlaying the result screen and the function execution screen on a predetermined portion of the screen on which the content is being outputted.

14. The method of claim 9, wherein, when the processed data is related to an execution of a specific function, whether or not a resource related to at least one or more function blocks is available for usage is determined, the resource being required for performing the corresponding function, and, based upon the determined result, if the resource is available for usage, the corresponding function block is called.

15. The method of claim 9, wherein, when the processed data correspond to a text message that is not related to an execution of a function, a resource for providing an interactive service is allocated, user history data associated with the text message are collected, and an interactive service including content recommendation is provided.

16. The method of claim 9, wherein the targeted device corresponds to a digital TV, and wherein the at least one or more controlling devices include at least one of wearable devices and mobile terminals.

* * * * *